(12) United States Patent
Mishima et al.

(10) Patent No.: US 7,399,511 B2
(45) Date of Patent: *Jul. 15, 2008

(54) OPTICAL RECORDING MEDIUM

(75) Inventors: Koji Mishima, Tokyo (JP); Daisuke Yoshitoku, Tokyo (JP); Kenji Yamaga, Tokyo (JP)

(73) Assignee: TDK Corporation, Tokyo (JP)

( * ) Notice: Subject to any disclaimer, the term of this patent is extended or adjusted under 35 U.S.C. 154(b) by 346 days.

This patent is subject to a terminal disclaimer.

(21) Appl. No.: 11/111,911

(22) Filed: Apr. 22, 2005

(65) Prior Publication Data

US 2005/0244753 A1 Nov. 3, 2005

Related U.S. Application Data

(60) Provisional application No. 60/564,229, filed on Apr. 22, 2004.

(30) Foreign Application Priority Data

| May 13, 2004 | (JP) | ............................ 2004-144075 |
| Feb. 15, 2005 | (JP) | ............................ 2005-038327 |

(51) Int. Cl.
*B32B 3/02* (2006.01)
(52) U.S. Cl. ................. 428/64.4; 428/64.5; 430/270.13
(58) Field of Classification Search ................ 428/64.4, 428/64.5; 430/270.13; 204/192.1
See application file for complete search history.

(56) References Cited

U.S. PATENT DOCUMENTS

| 4,405,706 | A | * | 9/1983 | Takahashi et al. ....... 430/270.12 |
| 6,096,399 | A | * | 8/2000 | Yoshinari et al. ........... 428/64.1 |
| 6,713,148 | B1 | * | 3/2004 | Hsu et al. ................... 428/64.1 |
| 6,764,736 | B2 | * | 7/2004 | Kitaura et al. ............. 428/64.1 |
| 6,933,032 | B2 | * | 8/2005 | Sasa et al. .................. 428/64.1 |
| 2005/0237894 | A1 | * | 10/2005 | Mishima et al. ................ 369/94 |
| 2007/0014225 | A1 | * | 1/2007 | Mishima et al. .......... 369/275.1 |
| 2007/0064585 | A1 | * | 3/2007 | Mishima et al. ............. 369/283 |
| 2007/0121480 | A1 | * | 5/2007 | Mishima et al. ............. 369/283 |

FOREIGN PATENT DOCUMENTS

| JP | A 59-185048 | 10/1984 |
| JP | A 2-1373 | 1/1990 |
| JP | B2 3-57540 | 9/1991 |
| JP | A 10-334507 | 12/1998 |
| JP | A 2002-133712 | 5/2002 |
| JP | A 2003-48375 | 2/2003 |

* cited by examiner

*Primary Examiner*—Elizabeth Mulvaney
(74) *Attorney, Agent, or Firm*—Oliff & Berridge, PLC

(57) ABSTRACT

An optical recording medium is provided, which are capable of recording and reproducing data with reliability even when blue or blue violet laser light is used as irradiation light. The optical recording medium includes a substrate, and a recording layer formed over the substrate and having its optical characteristic changed by irradiation of the laser light. The recording layer is substantially composed of Bi and O, and the ratio of the number of the O atoms to the total number of Bi and O atoms in the recording layer is 63-73%.

11 Claims, 7 Drawing Sheets

OPTICAL RECORDING MEDIUM

This nonprovisional application claims the benefit of U.S. Provisional Application No. 60/564,229, filed Apr. 22, 2004.

BACKGROUND OF THE INVENTION

1. Field of the Invention

The invention relates to an optical recording medium having a recording layer which makes an optical change for data recording when irradiated with laser light.

2. Description of Related Art

Optical recording media such as a compact disc (CD) and a digital versatile disc (DVD) are widely used as information recording media. In recent years, attention is being given to optical recording media which use blue or blue violet laser light as irradiation light so that a large amount of information can be recorded at still higher densities. For the sake of specification standardization, blue violet laser light having a wavelength of approximately 405 nm has been proposed for use, and compatible optical recording media are now becoming prevalent. When the blue or blue violet laser light is used as the irradiation light, tracks on an optical recording medium are formed at track pitches within the range of 0.1 to 0.5 µm. Incidentally, a plurality of recording layers may be formed with a transparent spacer layer(s) therebetween. This multilayer recording type allows a further increase in the recording capacity.

Optical recording media are broadly classified into a ROM (Read Only Memory) type in which data cannot be added or rewritten, an R (Recordable) type in which data can be added only once, and an RW (Rewritable) type in which data can be rewritten. The recording layer of R-type optical recording medium needs to make changes in optical characteristics when irradiated with laser light. Besides, it is essential that the recording layers be unsusceptible to deterioration even after a long period of storage, having excellent durability. Conventionally, organic dye has thus been used widely as a material of the recording layers of the R-type optical recording media. This conventional organic dye is a substance less likely to absorb ultraviolet rays and short-wave visible rays, such as blue and blue violet, which are prone to promote chemical reactions. It is this feature of the conventional organic dye that has contributed suppressed deterioration.

Since the conventional organic dye is less likely to absorb short-wave visible rays of blue and blue violet, however, it has been impossible to obtain satisfactory change in optical characteristics for data recording when the blue or blue violet laser light is used as the irradiation light. Moreover, it has been difficult to develop an organic dye which provides satisfactory change in optical characteristics even for situations where the blue or blue violet laser light is used as the irradiation light, and is unsusceptible to deterioration for a long period of storage.

In view of the foregoing, R-type optical recording media that have recording layers made of inorganic material containing Bi and O have been known(refer to, for example, Japanese Patent Laid-Open Publications Nos. 2003-48375 and Hei 10-334507).

Nevertheless, even the inorganic material containing Bi and O has sometimes failed to achieve desired change in optical characteristics when the blue or blue violet laser light is used as the irradiation light.

Besides, such an inorganic material containing Bi and O can vary in reflectance and in light transmittance as well, when irradiated with laser light. Consequently, if the inorganic material containing Bi and O is used to make the recording layers of an optical recording medium of multilayer recording type, the laser light to reach the lower(on the substrate side) recording layer varies in intensity between where the upper (on the cover-layer side) recording layer has been irradiated with the laser light to form recording marks and where not. There has thus been the problem that the accuracy of recording of data on the lower recording layer and the accuracy of reproduction of data from the lower recording layer are low.

SUMMARY OF THE INVENTION

In view of the foregoing problems, various exemplary embodiments of this invention provide an optical recording medium which are capable of recording and reproducing data with reliability even when blue or blue violet laser light is used as the irradiation light.

Various exemplary embodiments of this invention provide an optical recording medium in which the material of its recording layer is mainly composed of Bi (bismuth) and O (oxygen), and the ratio of the number of the O atoms is 63% or higher in the material, so that data can surely be recorded/reproduced to/from the medium with blue or blue-violet laser light serving as irradiation light.

The conventional inorganic material containing Bi and O is chiefly composed of $Bi_2O_3$, and thus the ratio of the number of O atoms in the recording layer is approximately 60%. Meanwhile, in the process of achieving the present invention, the inventors have made various recording layers containing Bi and O in different composition ratios, and examined them for optical characteristics. From the examination, it has been found that the ratio of the number of O atoms in the recording layer can be set at or above 63% to record and reproduce data with reliability. The reason for this is an increase in the difference between the reflectance of areas where recording marks are formed by the irradiation of blue or blue violet laser light (having a wavelength of the order of 380 to 450 nm) and the reflectance of areas where no recording mark is formed. The inventors have also found that the ratio of the number of O atoms in the recording layer can be set at or above 63% with a significant increase in light transmittance. Besides, the difference between the light transmittance of the areas where recording marks are formed and the light transmittance of the areas where no recording mark is formed becomes smaller. This material is thus suited for the recording layers of an optical recording medium of multilayer recording type.

Accordingly, various exemplary embodiments of the invention provide an optical recording medium comprising:

a substrate; and a recording layer formed over the substrate and having its optical characteristic changed by irradiation of laser light, the recording layer being substantially composed of Bi and O, a ratio of number of the O atoms in the recording layer being within range of 63% to 73%.

Moreover, various exemplary embodiments of the invention provide an optical recording medium comprising:

a substrate; and a recording layer formed over the substrate and having its optical characteristic changed by irradiation of laser light, total number of atoms of Bi and O in the recording layer is 90% or higher with respect to number of all atoms constituting the recording layer, and ratio of number of the O atoms to total number of the Bi and O atoms constituting the recording layer is 63% or higher Various exemplary embodiments of the invention provide
an optical recording medium comprising:
a substrate; and
a recording layer formed over the substrate and having its optical characteristic changed by irradiation of laser light, the recording layer being substantially composed of Bi, O, and M, the M being at least one element selected from the group consisting of Mg, Ca, Y, Dy, Ce, Tb, Ti, Zr, V, Nb, Ta, Mo, W, Mn, Fe, Zn, Al, In, Si, Ge, Sn, Sb, Li, Na, K, Sr, Ba, Sc, La, Nd, Sm, Gd, Ho, Cr, Co, Ni, Cu, Ga, and Pb,
a ratio of total number of the Bi and O atoms to total number of the Bi, O, and M atoms being 80% or higher,
a ratio of the numbers of the Bi, O, and M atoms being in the range represented by the following expression:

$$73 \geq \{[O-(M \times \alpha/2)]/[Bi+O-(M \times \alpha/2)]\} \times 100 \geq 63$$

where $\alpha$ is a valence of the M.

Moreover, various exemplary embodiments of the invention provide
an optical recording medium comprising:
a substrate; and
a recording layer formed over the substrate and having its optical characteristic changed by irradiation of laser light, the recording layer being composed of Bi, O, and M, the M being at least one element except Bi and O,
a ratio of number of the Bi atoms to number of the Bi and M atoms being 50% or higher,
a ratio of numbers of the Bi, O, and M atoms being in the range represented by the following expression:

$$73 \geq \{[O-(M \times \alpha/2)]/[Bi+O-(M \times \alpha/2)]\} \times 100 \geq 63$$

where $\alpha$ is a valence of the M.

Moreover, various exemplary embodiments of the invention provide
an optical recording medium comprising:
a substrate; and
a recording layer formed over the substrate and having its optical characteristic changed by irradiation of laser light, the recording layer being composed of Bi, O, and M, the M being at least one element except Bi and O,
a ratio of number of the Bi atoms to number of the Bi and M atoms being 50% or higher,
a ratio of numbers of the Bi, O, and M atoms being in the range represented by the following expression (III):

$$\{[O-(M \times \alpha/2)]/[Bi+O-(M \times \alpha/2)]\} \times 100 \geq 63 \quad (III)$$

where $\alpha$ is a valence of the M.

As employed herein, the phase "a recording layer is substantially made of Bi and O" shall mean that the total number of atoms of Bi and O in the recording layer is 80% or higher with respect to the number of all the atoms constituting the recording layer.

In case that the recording layer is substantially made of Bi and O, it is preferable that the total number of atoms of Bi and O in the recording layer is 90% or higher with respect to the number of all the atoms constituting the recording layer.

Moreover, the phase "a recording layer is substantially made of Bi, O and M" shall mean that the total number of atoms of Bi O and M in the recording layer is 80% or higher. In case that the recording layer is substantially made of Bi, O and M, it is preferable that the total number of atoms of Bi, O and M in the recording layer is 90% or higher with respect to the number of all the atoms constituting the recording layer.

Moreover, Bi, O, and M in expressions shall represent the numbers of atoms of Bi, O, and M, respectively.

The recording layer 18 is substantially composed of Bi and O, and the ratio of the number of the O atoms in the recording layer 18 is in the range from 63% to 73%. Note that the ratio of the number of the O atoms in the recording layer 18 is preferably 63% or higher with respect to the total number of the Bi and O atoms in the recording layer 18.

Note that in the first and second exemplary embodiments, the recording layer 18 is substantially composed of Bi and O, and the ratio of the number of the O atoms in the recording layer 18 is in the range from 63% to 73%. Meanwhile, when for example only a single layer is formed to serve as the recording layer 18 as in the first exemplary embodiment, and the difference in the light transmittance between recording marks and the space part without the marks is not crucial, the ratio of the number of the O atoms in the recording layer 18 may be greater than 73%.

DETAILED DESCRIPTION OF THE PREFERRED EMBODIMENTS

Hereinafter, preferred exemplary embodiments of the present invention will be described in detail with reference to the drawings.

Figure 1:
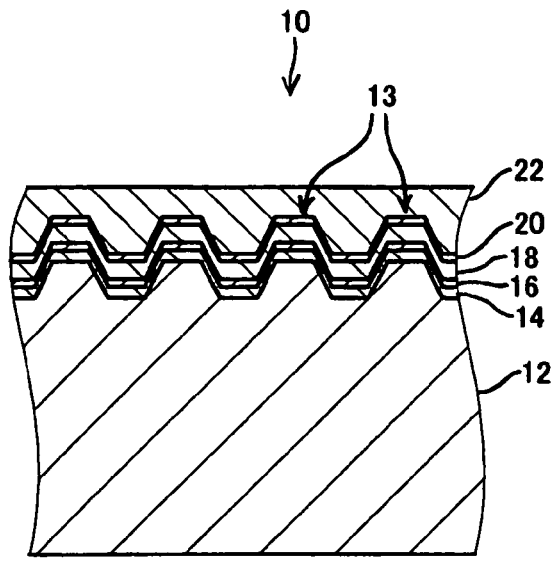
FIG. 1 is a sectional side view schematically showing the configuration of an optical recording medium according to a first exemplary embodiment of the present invention.

As shown in FIG. 1, an optical recording medium 10 according to a first exemplary embodiment of the present invention has a substrate 12 and a reflecting layer 14, a dielectric layer 16, a recording layer 18, a dielectric layer 20, a cover layer 22 which are formed over one side of the substrate 12 in this order. The optical recording medium 10 is an optical disc of R type in which the recording layer 18 varies in optical characteristic when irradiated with laser light, and is characterized by the material of the recording layer 18. The optical recording medium 10 is shaped like a circular disc having an outer diameter of approximately 120 mm and a thickness of approximately 1.2 mm.

The substrate 12 has a thickness of approximately 1.1 mm. Tracks 13 are formed on the surface of the substrate 12 facing to the reflecting layer 14, in the form of grooves at track pitches of 0.1 to 0.5 μm. The term "groove" is typically used as a concave portion of a track. As employed herein, however, the term "groove" shall also refer to a convex portion of a track. In this exemplary embodiment, the grooves are convex portions protruding toward the cover layer 22. The substrate 12 may be made of such materials as polycarbonate resin, acryl resin, epoxy resin, polystyrene resin, polyethylene resin, polypropylene resin, silicone resin, fluorine-based resin, ABS resin, and urethane resin.

The reflecting layer 14, the dielectric layer 16, the recording layer 18, and the dielectric layer 20 are formed in a concavo-convex pattern according to that of the substrate 12.

The reflecting layer 14 may be made of such materials as Al, Ag, Au, Cu, Mg, Ti, Cr, Fe, Co, Ni, Zn, Ge, Ag, and Pt. Of these, Al, Ag, Au, and Cu are preferably used in view of higher reflectances.

The dielectric layers 16 and 20 may be made chiefly of such materials as oxides including $SiO_2$, $Al_2O_3$, ZnO, $CeO_2$, and $Ta_2O_5$, nitrides including SiN, AlN, GeN, and GeCrN, and sulfides including ZnS, and composite materials of these.

The recording layer 18 is substantially composed of Bi and O, and the ratio of the number of the O atoms in the recording layer 18 is in the range from 62% to 73%. Note that the ratio of the number of the O atoms in the recording layer 18 is preferably 62% or higher with respect to the total number of the Bi and O atoms in the recording layer 18.

The cover layer 22 has a thickness of approximately 100 μm. The cover layer 22 may be made of energy ray curable resin such as transparent UV curable acrylic resin and UV curable epoxy resin. Here, the term "energy rays" shall refer collectively to electromagnetic waves and particle beams such as ultraviolet rays and electron rays, which have the property of curing certain fluid resins. Incidentally, the cover layer 22 may be made of a transparent film.

Now, description will be given of the operation of the optical recording medium 10. The optical recording medium 10 is irradiated with blue or blue violet laser light for recording, whereby recording marks are formed in the areas of the tracks 13 on the recording layer 18. Each of the recording marks is composed of a plurality of cavities 26. The reflectance (to be detected by a photodetector for reproduction) of the areas of the recording marks becomes lower, (i.e., cause a change in optical characteristic) with respect to space areas where no recording mark is formed. Information is recorded by forming a plurality of recording marks 24 and a plurality of space areas on the tracks 13.

If blue or blue-violet laser light is used, sufficient difference in the reflectance is generated between recording marks and spaces, so that information can surely be recorded/reproduced.

In the optical recording medium 10, the dielectric layer 16 is formed on one side of the recording layer 18, and the dielectric layer 20 on the other side of the same. This makes it difficult for moisture in the substrate 12 and external moisture to reach the recording layer 18, thereby allowing the effect of suppressing the deterioration of the recording layer 18 accordingly.

Figure 2:
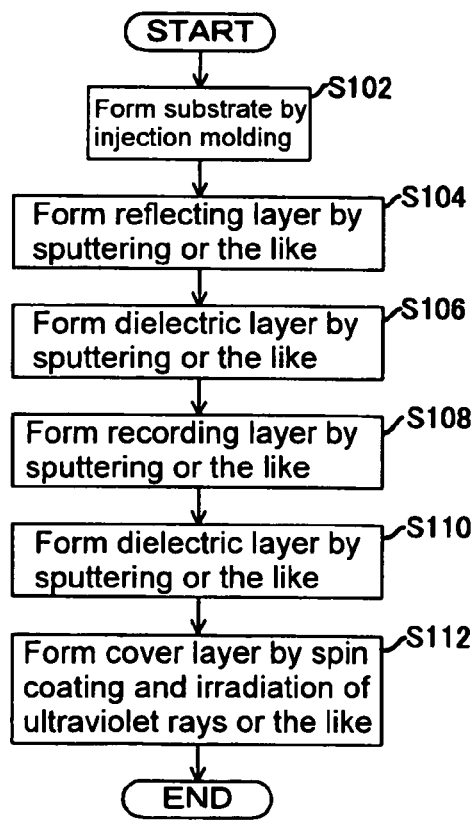
FIG. 2 is a flowchart showing an overview of the steps of manufacturing the optical recording medium.

Next, an example of the method of manufacturing the optical recording medium 10 will be described with reference to the flowchart shown in FIG. 2 and the like.

Initially, a substrate 12 having the shape of a circular disc is formed by injection molding, with an outer diameter of approximately 120 mm and a thickness of approximately 1.1 mm (S102) Here, tracks 13 are formed in a concavo-convex pattern on one side of the substrate 12.

Next, on the side of the substrate 12 where the tracks 13 are formed, a reflecting layer 14 is formed by a vapor phase epitaxial technique such as sputtering and vapor deposition (S104). A dielectric layer 16 is also formed on the reflecting layer 14 by sputtering or the like (S106). The reflecting layer 14 and the dielectric layer 16 are formed in a concavo-convex pattern according to that of the tracks 13.

Next, a recording layer 18 is formed on the dielectric layer 16 by sputtering or the like (S108). To be more specific, the substrate 12 is placed in a chamber (not shown) in which a Bi target is arranged, and $O_2$ gas is supplied into the chamber. Then, sputtering gas such as Ar and Xe is supplied into this chamber so as to impinge the Bi target. This sputters Bi particles, which react with $O_2$ in the chamber and deposit on the dielectric layer 16 of the substrate 12. As a result, the recording layer 18 is formed in an almost uniform thickness along the concavo-convex pattern of the tracks 13. The sputtering conditions can be adjusted to control the ratio of Bi and O in the recording layer 18. Incidentally, while it is preferable that the recording layer 18 be chiefly composed of Bi and O, some small amounts of other elements and compounds may be mixed in.

Next, a dielectric layer 20 is formed on the recording layer 18 by sputtering, vapor deposition, or the like (S110). The dielectric layer 20 is also formed in a concavo-convex pattern according to that of the tracks 13.

Finally, a cover layer 22 is spread over the dielectric layer 20 to a thickness of 100 μm by spin coating, and irradiated with ultraviolet rays or the like for curing (S112). Here, a prefabricated film may be bonded to form the cover layer 22. The optical recording medium 10 is thus completed.

Now, description will be given of a second exemplary embodiment of the present invention.

Figure 3:
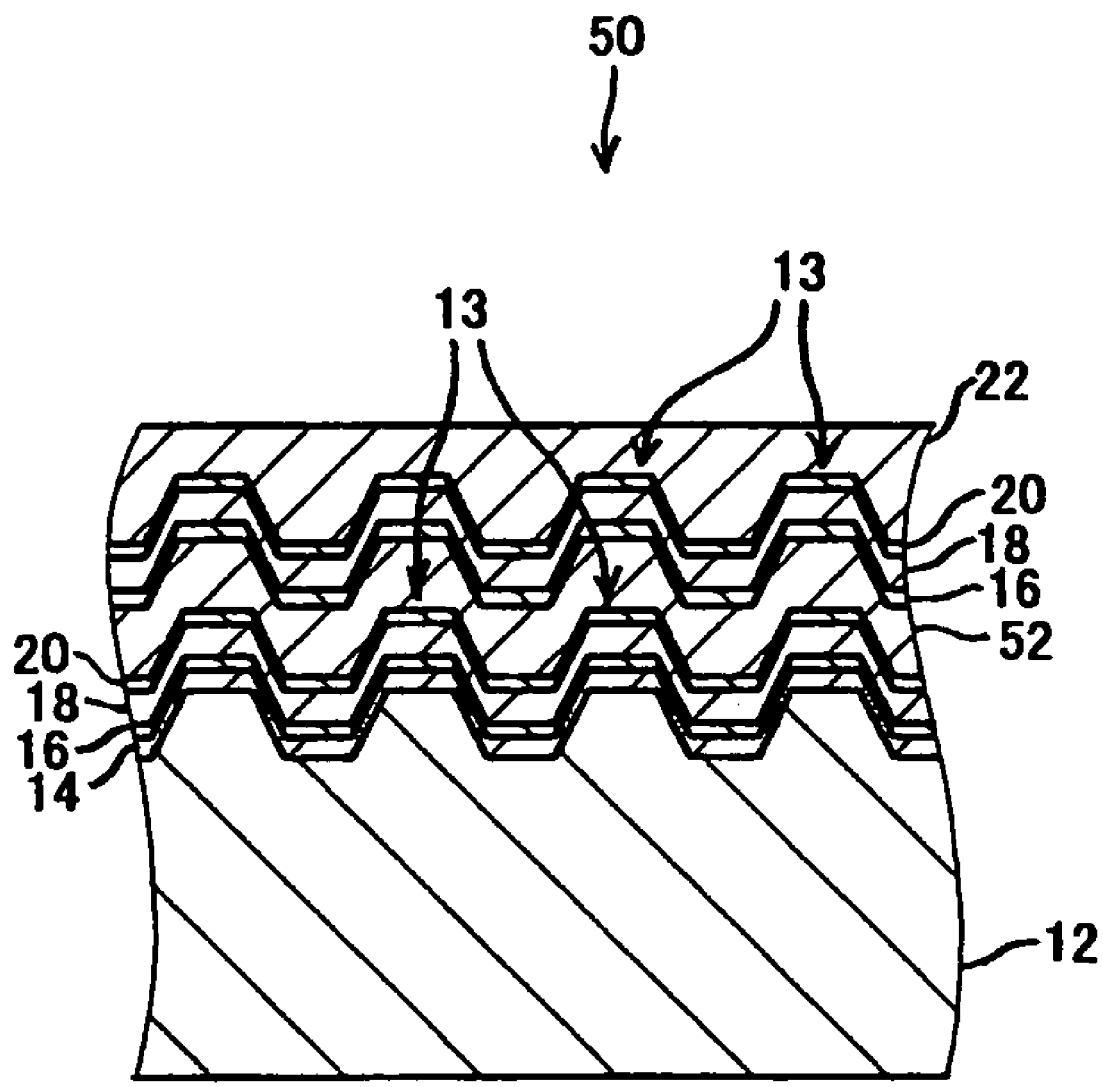
FIG. 3 is a sectional side view schematically showing the configuration of the optical recording medium according to a second exemplary embodiment of the present invention.

As shown in FIG. 3, an optical recording medium 50 according to this second exemplary embodiment comprises a transparent spacer layer 52, and is characterized in that two recording layers 18 are formed with the spacer layer 52 therebetween. Note that no reflecting layer 14 is formed on the spacer layer 52. The rest of the configuration is the same as that of the optical recording medium 10 according to the foregoing first exemplary embodiment. The same reference numerals as in FIG. 1 will thus be given, and description thereof will be omitted. Depending on the type of the optical recording medium, the two recording layers 18 may be provided with tracks 13 of an identical concavo-convex pattern or different concavo-convex patterns.

The spacer layer 52 has a thickness of approximately 25 μm. The spacer layer 52 may be made chiefly of energy ray curable transparent resin such as UV curable acrylic resin and UV curable epoxy resin.

The optical recording medium 50 is capable of recording information on the two recording layers 18, and thus has an accordingly higher recording capacity. In the optical recording medium 50, the recording layers 18 are substantially made of Bi and O, and have a high light transmittance of 70% or above. The recording layers 18 can lowered the reflectance (to be detected by the photodetector for reproduction) of the areas of the recording marks 24 while hardly changing the transmittance for blue or blue violet laser light. Consequently, it is possible to irradiate the lower recording layer 18 (the one closer to the substrate 12) with blue or blue violet laser light of constant intensity irrespective of the presence or absence of data recorded on the upper recording layer 18 (the one closer to the cover layer 22). Data can thus be recorded on the lower recording layer 18 with high accuracy. In addition, the data recorded on the lower recording layer 18 can be reproduced with high accuracy.

Here, an example of the method of manufacturing the optical recording medium 50 will be described briefly. Initially, a reflecting layer 14, a dielectric layer 16, a recording layer 18, and a dielectric layer 20 are formed over the substrate 12 in the same manner as in the foregoing first exemplary embodiment. Next, the material of the spacer layer 52 is applied onto the dielectric layer 20. A transparent stamper is put into contact with the material so that the surface of the spacer layer 52 opposite from the substrate 12 is formed into the concavo-convex pattern of tracks 13 and spacer layer 52 has a thickness of 25 μm. The material is then irradiated with the energy rays through the transparent stamper, whereby the spacer layer 52 is cured. Then, the transparent stamper is released. Moreover, a dielectric layer 16, a recording layer 18, a dielectric layer 20, and a cover layer 22 are formed on the spacer layer 52 in the same manner as in the first exemplary embodiment. As a result, the optical recording medium 50 is obtained.

Note that in the first and second exemplary embodiments, the recording layer 18 is substantially composed of Bi and O, and the ratio of the number of the O atoms in the recording layer 18 is in the range from 62% to 73%. Meanwhile, when for example only a single layer is formed to serve as the recording layer 18 as in the first exemplary embodiment, and the difference in the light transmittance between recording marks and the space part without the marks is not crucial, the ratio of the number of the O atoms in the recording layer 18 may be greater than 73%.

The material of the recording layer 18 may substantially be composed of Bi, O, and M (the M being at least one element selected from the group consisting of Mg, Ca, Y, Dy, Ce, Tb, Ti, Zr, V, Nb, Ta, Mo, W, Mn, Fe, Zn, Al, In, Si, Ge, Sn, Sb, Li, Na, K, Sr, Ba, Sc, La, Nd, Sm, Gd, Ho, Cr, Co, Ni, Cu, Ga, and Pb). The ratio of the numbers of the Bi, O, and M atoms may be in the range represented by the following expression (I):

$$\{[O-(M\times\alpha/2)]/[Bi+O-(M\times\alpha/2)]\}\times 100 \geq 62 \quad (I)$$

wherein α is the valence of M.

Moreover, the ratio of the numbers of the Bi, O, and M atoms may be in the range represented by the following expression (III):

$$\{[O-(M\times\alpha/2)]/[Bi+O-(M\times\alpha/2)]\}\times 100 \geq 63 \quad (III)$$

wherein α is the valence of M.

In these cases, the ratio of the numbers of the Bi, O, and M atoms is preferably in the range represented by the following expression (II):

$$\{[O-(M\times\alpha/2)]/[Bi+O-(M\times\alpha/2)]\}\times 100 \geq 73 \quad (II)$$

Note that in the present application, the term "valence α of M" refers to a value twice the ratio of the number of O atoms to the number of M atoms in a chemical compound that is thermodynamically most stable at 1 atm and 25° C. among chemical compounds consisting of M and O. The valence α of each of the elements included in M is given in Table 1.

TABLE 1

| valence α | elements |
|---|---|
| 1 | Li, Na, K |
| 2 | Mg, Ca, Zn, Sr, Ba, Co, Ni, Cu, Pb |
| 3 | Y, Dy, Tb, Fe, Al, In, Sb, Sc, La, Nd, Sm, Gd, Ho, Cr, Ga |

TABLE 1-continued

| valence α | elements |
|---|---|
| 4 | Ce, Ti, Zr, Mn, Si, Ge, Sn |
| 5 | V, Nb, Ta, Mo |
| 6 | W |

Now, the expressions (I) and (II) will briefly be described. It is considered that the number of O atoms which are combined with M atoms is (M×α/2), because a valence of O is two. In the recording layer exclusive of M oxide, the number of the O atoms is [O−(M×α/2)], and the total number of the Bi and O atoms is [Bi+O−(M×α/2)]. Therefore, when the ratio of the numbers of the Bi, O, and M atoms is limited to the range represented by the expressions (I) and (II), in the recording layer 18 exclusive of M oxide, the ratio of the number of the O atoms to the total number of the Bi and O atoms is in the range from 62% to 73%.

In the same manner, when the ratio of the numbers of the Bi, O, and M atoms is limited to the range represented by the expression (III), in the recording layer 18 exclusive of M oxide, the ratio of the number of the O atoms to the total number of the Bi and O atoms is 63% or higher. Bi has a relatively low melting point of approximately 271° C. When a pure Bi target is used to deposit the recording layer by sputtering, the deposition power must be suppressed with an increase in the deposition time by that much. In contrast, the elements mentioned above can be added to raise the melting point, so that the recording layer can be deposited quickly with higher deposition power.

The preservation characteristic can be improved when the recording layer 18 has a composition including M with Bi and O. The M is at least one element selected from the group consisting of Mg, Ca, Y, Dy, Ce, Tb, Ti, Zr, V, Nb, Ta, Mo, W, Mn, Fe, Zn, Al, In, Si, Ge, Sn, Sb, Li, Na, K, Sr, Ba, Sc, La, Nd, Sm, Gd, Ho, Cr, Co, Ni, Cu, Ga, and Pb.

The preservation characteristic will later be described in connection with Example 2.

In this way, when the material of the recording layer 18 includes M, the ratio of the total number of the Bi and O atoms to the total number of the Bi, O, and M atoms is preferably 80% or higher.

Furthermore, when the material of the recording layer 18 includes M, the ratio of the number of the Bi atoms to the total number of the Bi and M atoms is preferably 38% or higher, and more preferably 50% or higher.

In the foregoing first and second exemplary embodiments, the reflecting layer 14 is formed on the substrate 12. The reflecting layer may be omitted, however, when the recording marks 24 and the space areas provide sufficient amounts of differences in optical characteristics such as reflectance.

Figure 8:
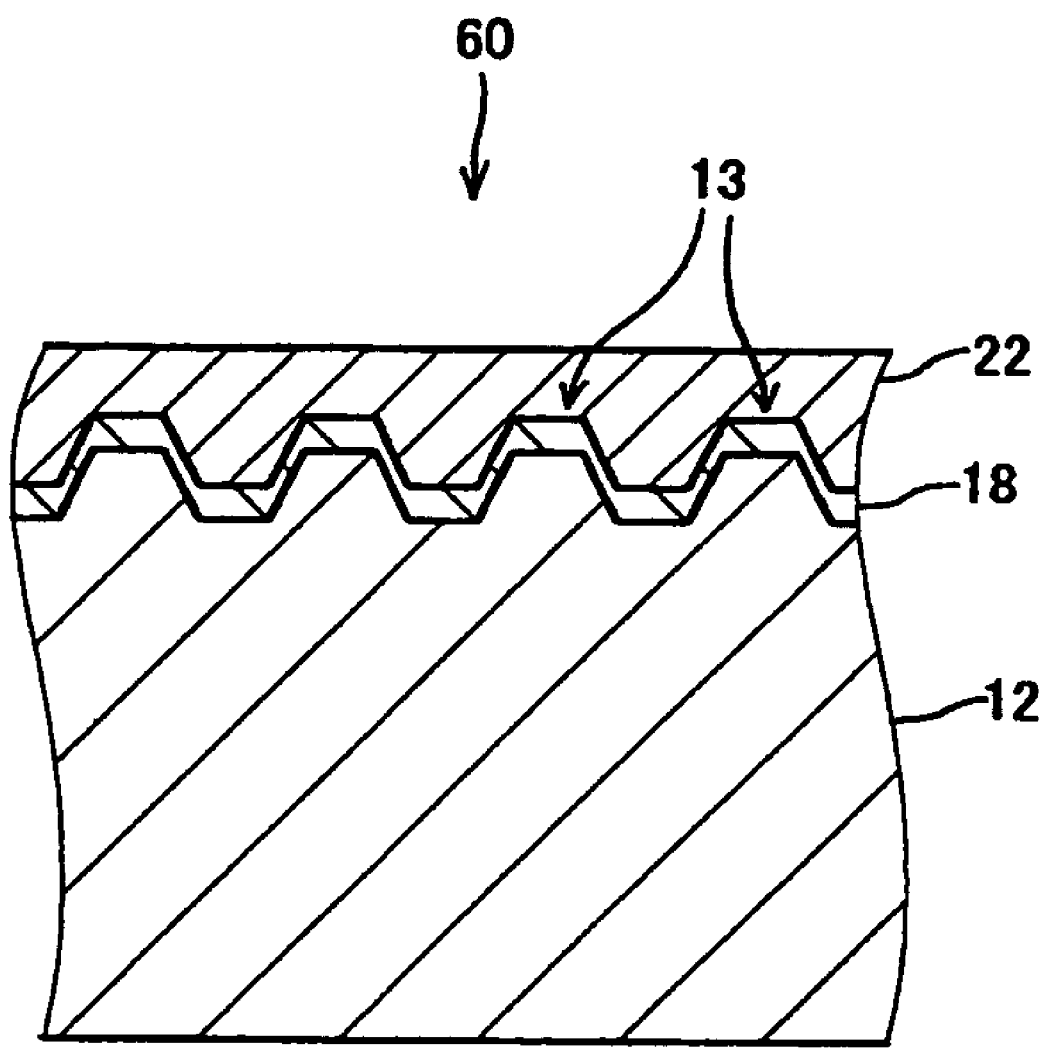
FIG. 8 is a sectional side view schematically showing the configuration of the optical recording medium according to a third exemplary embodiment of the present invention.

In the foregoing first and second exemplary embodiments, the dielectric layers 16 and 20 are formed on both sides of the recording layers 18. However, a dielectric layer may be formed on one side of a recording layer 18 alone. In this case, it is possible to suppress external moisture from reaching the recording layer 18 if the dielectric layer is formed on the side of the recording layer 18 closer to the cover layer 22. On the other hand, when the dielectric layer is formed on the side of the recording layer 18 closer to the substrate 12, it is possible to suppress moisture contained in the substrate 12 and external moisture penetrating the substrate 12 from reaching the recording layer. When a plurality of recording layers are formed with a spacer layer therebetween as in the foregoing second exemplary embodiment, dielectric layers are preferably formed on the cover-layer side (light-incident side) of a recording layer that is the closest to the cover layer and on the substrate-side of a recording layer that is the closest to the substrate. This can suppress moisture from reaching the recording layers from either of the cover-layer side and the substrate side. When a good preservation characteristic is obtained for the recording layer, a dielectric layer may be omitted like the optical recording medium 60 according to the third exemplary embodiment of the invention shown in FIG. 8.

The optical recording medium 60 is different from the optical recording medium 10 according to the first exemplary embodiment in that the dielectric layers 16 and 20 and the reflection layer 18 are omitted, and that the recording layer 18 is in direct contact with the substrate 12 and the cover layer 22. In such a simple configuration, the cost can be reduced.

In this case, in order to obtain a good preservation characteristic, the material of the recording layer 18 preferably includes M with Bi and O. The M is at least one element selected from the group consisting of Mg, Ca, Y, Dy, Ce, Tb, Ti, Zr, V, Nb, Ta, Mo, W, Mn, Fe, Zn, Al, In, Si, Ge, Sn, Sb, Li, Na, K, Sr, Ba, Sc, La, Nd, Sm, Gd, Ho, Cr, Co, Ni, Cu, Ga, and Pb.

In the foregoing second exemplary embodiment, the optical recording medium 50 is of double layer recording type, having the two recording layers 18 with the spacer layer 52 therebetween. Nevertheless, the present invention is also applicable to an optical recording medium of multilayer recording type, in which two or more spacer layers and three or more recording layers are formed alternately.

In the foregoing first, second and third exemplary embodiments, the optical recording media 10, 50 and 60 are of single-sided recording type, being capable of recording information on one side alone. However, that the present invention is also applicable to an optical recording medium of double-sided recording type having recording layers on both sides.

In the foregoing first, second and third exemplary embodiments, the optical recording media 10, 50 and 60 have tracks 13 that are formed as convex grooves as viewed from the side of the cover layer 22. It is understood, however, that the present invention is also applicable to an optical recording medium of groove type in which the tracks are made of concave grooves as viewed from the side of the cover layer 22. It is also understood that the present invention is applicable to an optical recording medium of land and groove recording type in which both land and groove portions make tracks.

In the foregoing first, second and third exemplary embodiments, the optical recording media 10, 50 and 60 are configured so that the cover layer 22 is thinner than the substrate 12. However, that the present invention is also applicable to an optical recording medium having a substrate and a cover layer of equal thicknesses like DVD.

EXAMPLE 1

A plurality of optical recording media were made by the same technique as in the foregoing first exemplary embodiment. These optical recording media were configured such that the reflecting layer 14 was omitted from the optical recording medium 10 according to the foregoing first exemplary embodiment. The rest of the configuration was the same as that of the optical recording medium 10. In the step of forming the recording layers of these optical recording media, respective different sputtering conditions were set as shown in Table 2, whereby seven types of optical recording media were made with recording layers containing Bi and O in different ratios.

The manufacturing method will now be described in detail. Initially, a plurality of substrates 12 were made of polycarbonate resin by injection molding. Each of the substrates 12 had a thickness of 1.1 mm and a diameter of 120 mm. Convex grooves having a height of 20 nm were formed on the surfaces as tracks 13 at pitches of 0.32 μm.

Next, these substrates 12 were placed in a sputtering system, and dielectric layers 16 were initially formed to a thickness of 10 nm. Here, the dielectric layers 16 were made of $Al_2O_3$.

Then, these substrates 12 were placed in a sputtering system one by one, on which a recording layer 18 was formed to a thickness of 15 nm. Here, as shown in Table 2, the deposition power of the Bi target and the flow rates of the Ar gas and $O_2$ gas were adjust to control the ratio of Bi and O in the recording layers 18.

TABLE 2

| | Gas flow rate (sccm) | | Composition (at %) | | (dB) | Before recording | | After recording - before recording | | Absorptance at respective wavelength | | |
|---|---|---|---|---|---|---|---|---|---|---|---|---|
| Pw | Ar | $O_2$ | Bi | O | 8T C/N | Light transmittance | absorptance | Δ T | Δ A | 405 nm | 650 nm | 780 nm |
| 10 | 50 | 50 | 23 | 77 | 52.8 | 85.2% | 10.1% | 2.6% | −2.0% | 10.1% | 0.0% | 0.0% |
| 10 | 50 | 25 | 27 | 73 | 53.6 | 83.1% | 8.9% | 2.1% | −1.4% | 8.9% | 0.0% | 0.0% |
| 10 | 50 | 15 | 30 | 70 | 56.1 | 76.9% | 13.4% | 1.5% | −1.0% | 13.4% | 4.6% | 3.7% |
| 10 | 50 | 13 | 32 | 68 | 57.2 | 76.0% | 13.6% | 0.0% | 1.2% | 13.6% | 4.9% | 3.8% |
| 10 | 50 | 12 | 34 | 66 | 56.3 | 78.1% | 14.3% | −0.6% | 0.9% | 14.3% | 3.7% | 2.1% |
| 8 | 50 | 10 | 37 | 63 | 52.6 | 70.6% | 21.6% | −1.6% | 1.6% | 22.6% | 13.5% | 9.3% |
| 7 | 50 | 9 | 38 | 62 | 47.5 | 67.3% | 23.6% | −2.0% | 2.3% | 24.6% | 15.1% | 10.8% |
| 4 | 50 | 8 | 40 | 60 | 33.8 | 58.4% | 33.5% | −2.9% | 3.2% | 33.5% | 25.0% | 21.1% |

Next, dielectric layers 20 were formed on the recording layers 18 to a thickness of 20 nm by sputtering. Like the dielectric layers 16, the dielectric layers 20 were also made of $Al_2O_3$.

Finally, UV curable acryl resin was applied onto the dielectric layers 20 and spread to a thickness of 100 μm by spin coating, before irradiated with ultraviolet rays for curing.

The seven types of optical recording media obtained thus were measured for reflectance and absorptance, followed by calculation of light transmittances.

Next, the seven types of optical recording media were placed in an optical recording medium evaluation system DDU 1000 (from Pulsetec Industrial Co., Ltd.) one by one. The recording power Pw of the laser light was increased gradually from 3 mW to 10 mW to form recording marks having lengths of 2 T and 8 T on the recording layer for data recording. The rest of the conditions were set as follows:

Laser light wavelength: 405 nm,
Numerical aperture NA of the objective lens: 0.85,
Modulation mode: (1, 7) RLL,
Linear recording speed: 5.3 m/sec,
Channel bit length: 0.12 μm,
Channel clock: 66 MHz,
Recording method: on-groove recording,
Reproduction power: 0.7 mW,
Intermediate power: 2.0 mW, and
Base power: 1.0 mW.

For the purpose of observation, a substrate of land and groove type was also prepared, and recorded for every other track. The seven types of optical recording media having the recording marks 24 formed thus were measured for reflectance and absorptance, followed by calculation of light transmittances.

Next, by using the optical recording medium evaluation system mentioned above, the optical recording media were irradiated with laser beams one by one under the following conditions, whereby the 8 T-length recording marks recorded on the recording layers were reproduced. The reproduced signals were measured for the modulation factor and the C/N (carrier-to-noise) ratio. The C/N ratio was measured by using a spectrum analyzer XK180 (from Advantest Corporation). The reproducing conditions were set as follows:

Laser light wavelength: 405 nm,
Reproduction power Pr: 0.7 mW, and
Numerical aperture NA of the objective lens: 0.85.

Figure 4:
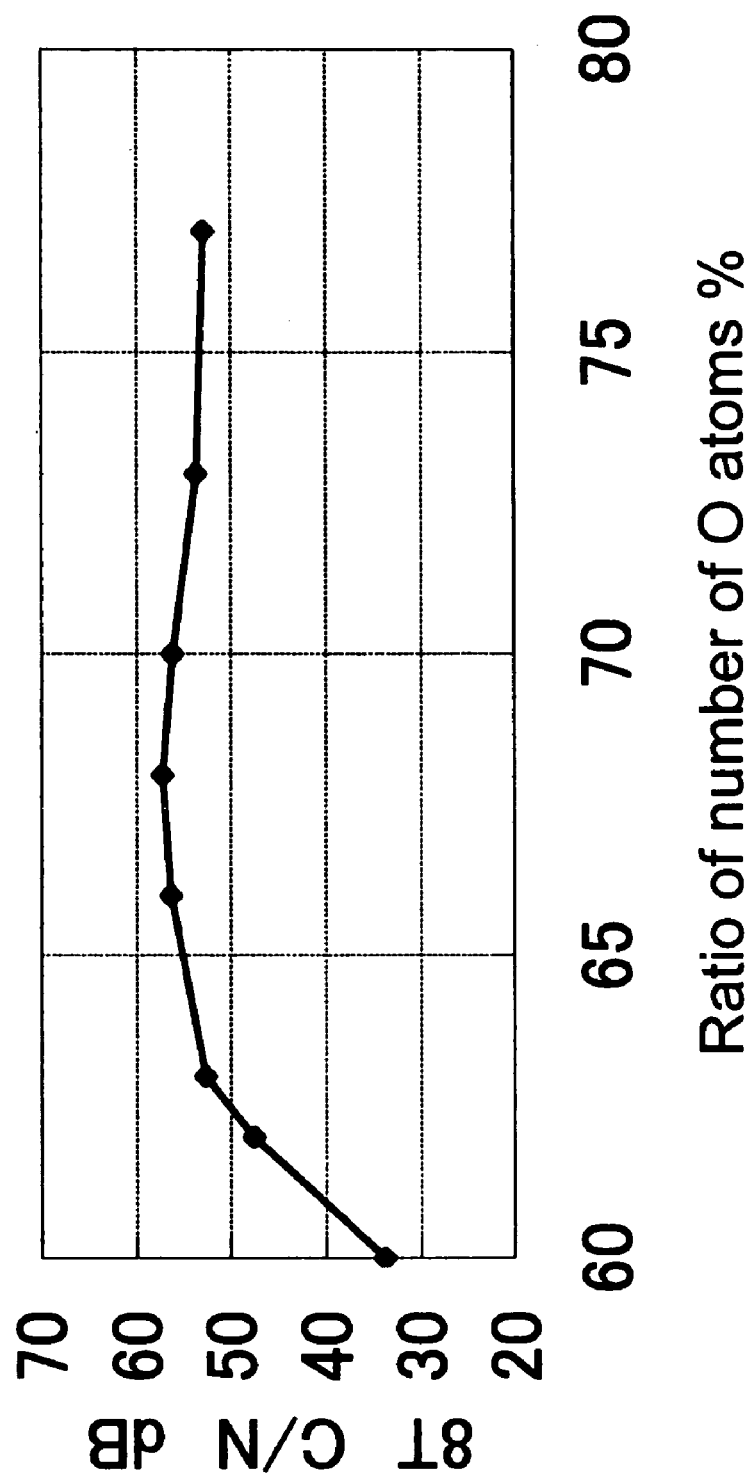
FIG. 4 is a graph showing the relationship between the ratio of the number of atoms of O in the recording layer and the C/N ratio of a signal reproduced from the 8 T recording marks in experimental examples.

FIG. 4 is a graph showing the relationship between the ratio of the number of O atoms in the recording layer and the C/N ratio of the signal reproduced from 8 T-length recording marks. As shown in FIG. 4, when the number of atoms of O is at a ratio of 60%, the C/N ratio is below 35 dB. Here, the recorded data is hard to reproduce with reliability. If the ratio of the number of atoms of O in the recording layer reaches or exceeds a ratio of 62%, the C/N ratio increases significantly to or above 45 dB. In this case, the recorded data can be reproduced favorably. Furthermore, the ratio of the number of atoms of O in the recording layer reaches or exceeds a ratio of 63%, the C/N ratio increases significantly to or above 50 dB. Therefore the recorded data can be reproduced more favorably. Incidentally, after approximately 50 hours of storage in a high-temperature high-humidity environment of 80° C. in temperature and 85% in humidity, the reproduction signals of the recording marks were measured for the C/N ratio again. Little change was observed. This confirms excellent data preservation characteristics.

Figure 5:
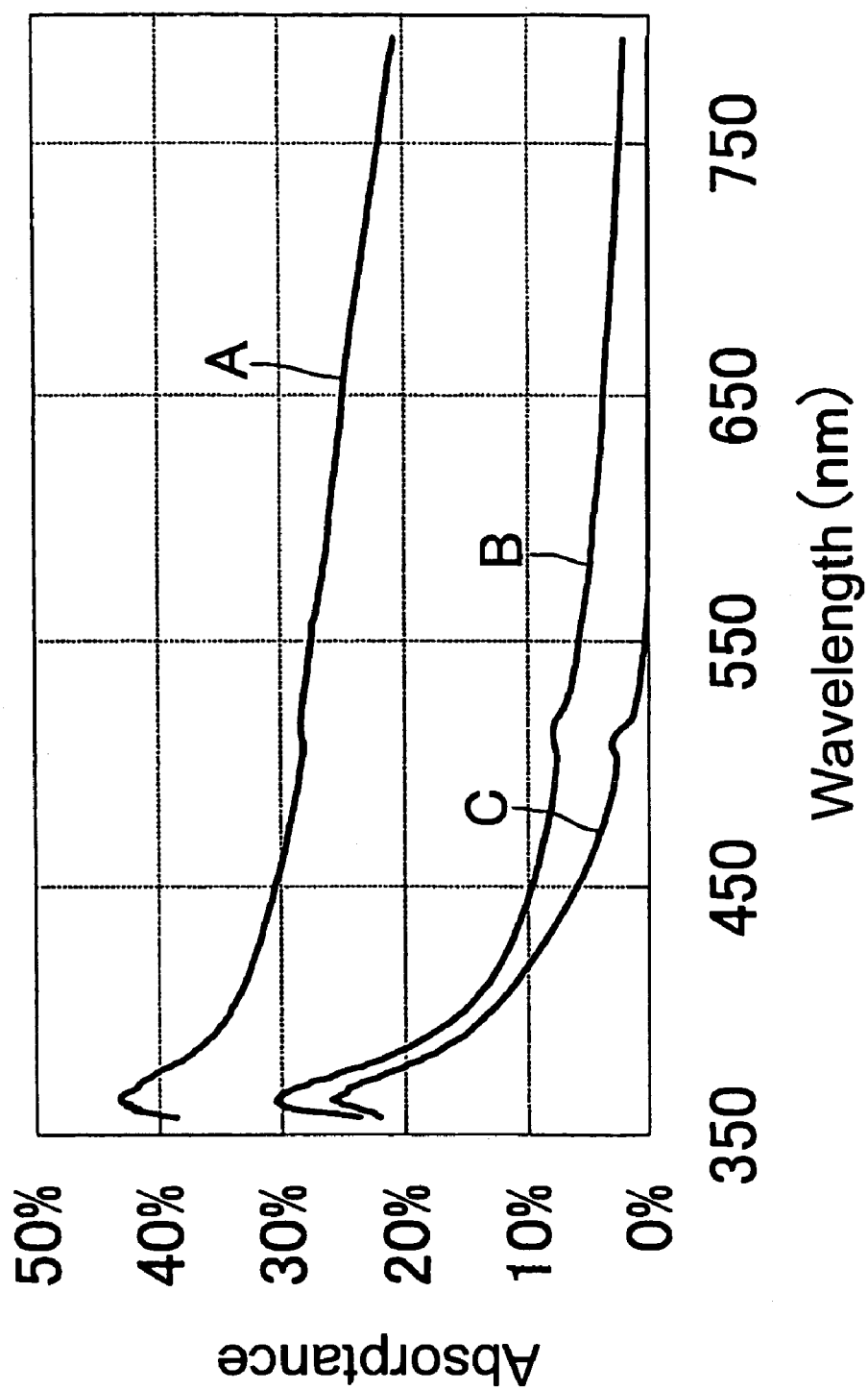
FIG. 5 is a graph showing the relationship between the wavelength and absorptance of irradiation light in the experimental examples.

Moreover, three types of optical recording media, of which the ratio of the number of O atoms in the recording layer were 60%, 66%, and 77%, were measured for the relationship between the wavelength and absorptance of the irradiation light. FIG. 5 shows the results. In FIG. 5, the curve designated by the reference symbol A shows the measurements on the optical recording medium of which the ratio of the number of O atoms in the recording layer was 60%. The curve designated by the reference symbol B shows the measurements on the optical recording medium of which the ratio of the number of O atoms in the recording layer was 66%. The curve designated by the reference symbol C shows the measurements on the optical recording medium of which the ratio of the number of O atoms was 77%. For the sake of proper operation, a recording layer must have an absorptance of at least 5% or higher. At or above an absorptance of 8%, it is possible to form recording marks with reliability. Consequently, the optical recording medium of which the ratio of the number of O atoms in the recording layer is 77% must be irradiated with laser light having a wavelength of 450 nm or shorter, and preferably with laser light of 420 nm or shorter. The optical recording medium of which the ratio of the number of O atoms in the recording layer is 66% must be irradiated with laser light having a wavelength of 550 nm or shorter, and preferably with laser light of 500 nm or shorter. The optical recording medium of which the ratio of the number of O atoms in the recording layer is 60% exhibits high absorptances of 20% and above across all the wavelengths of the irradiation light. Nevertheless, this recording layer is not actually available since it can only provide insufficient C/N ratios when the laser light having a wavelength of 405 nm is used as described above.

In short, the optical recording medium of which the ratio of the number of O atoms in the recording layer is 77% is suitably used when laser light having a wavelength of 450 nm or shorter is used as the irradiation light. The optical recording medium of which the ratio of the number of O atoms in the recording layer is 66% is suitably used when laser light having a wavelength of 550 nm or shorter is used as the irradiation light.

Figure 6:
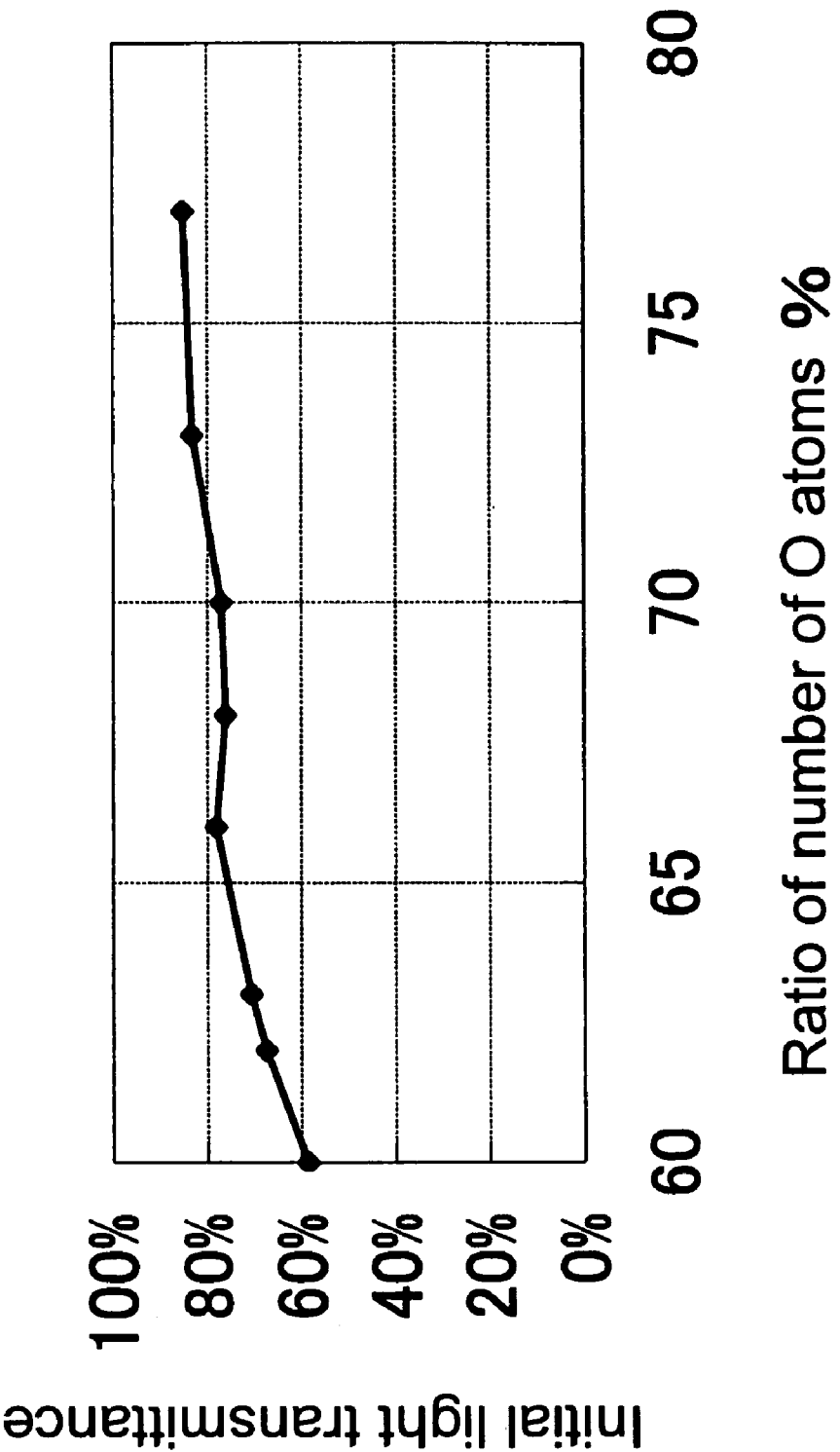
FIG. 6 is a graph showing the relationship between the ratio of the number of atoms of O in the recording layer and the light transmittance before formation of recording marks in the experimental examples.
Figure 7:
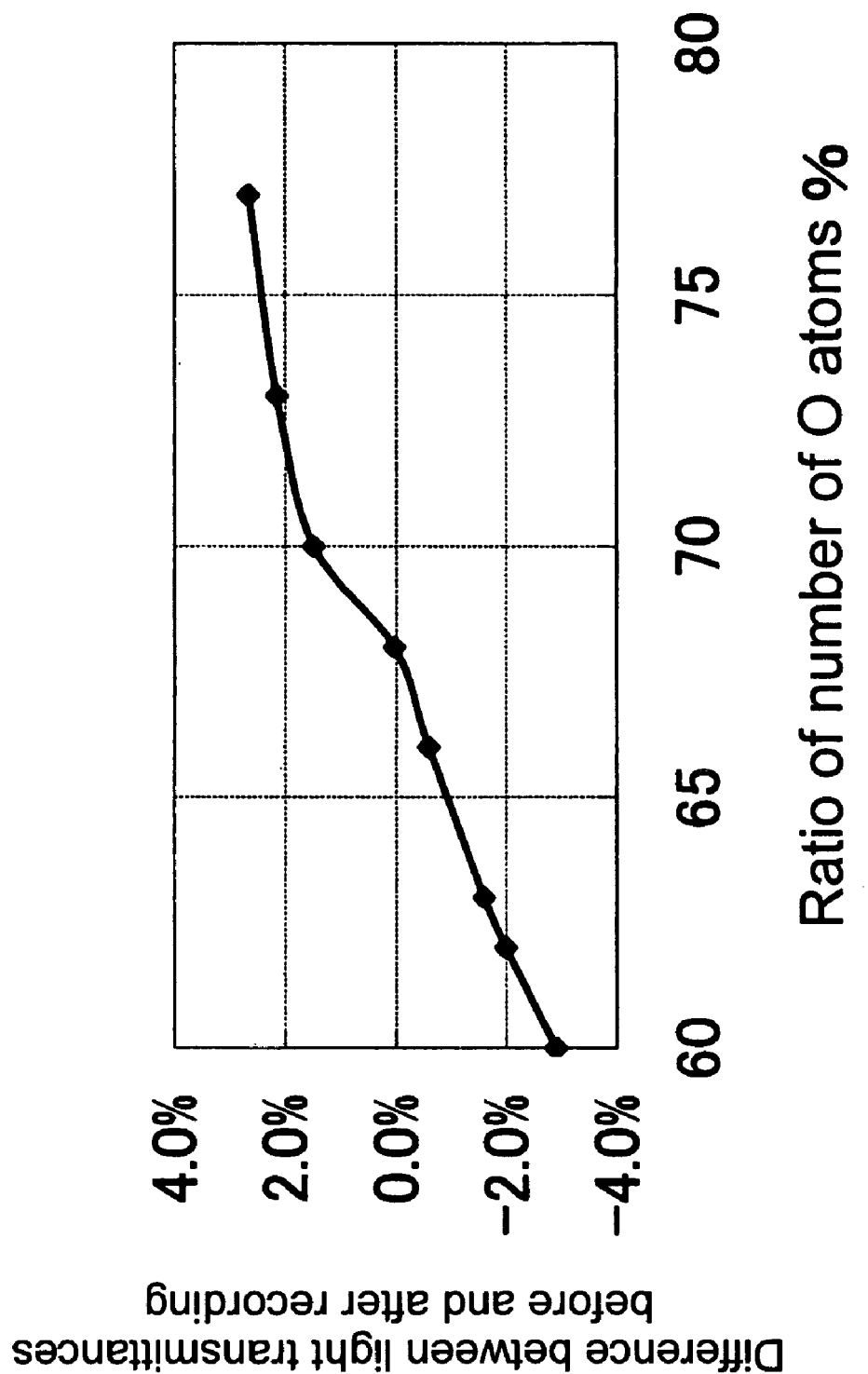
FIG. 7 is a graph showing the relationship between the ratio of the number of atoms of O in the recording layer and the difference between the light transmittances before and after the formation of the recording marks in the experimental examples.

FIG. 6 is a graph showing the relationship between the ratio of the number of O atoms in the recording layer and the light transmittance before formation of recording marks. FIG. 7 is a graph showing the relationship between the ratio of the number of O atoms in the recording layer and the difference between the light transmittances before and after the formation of recording marks. As shown in FIG. 6, the recording layer of the optical recording medium of which the ratio of the number of O atoms in the recording layer was 60% had a light transmittance of around 60%. In contrast, all the recording layers of the six types of optical recording media of which the ratio of the number of O atoms in the recording layer reached or exceeded 63% had high light transmittances of above 65%. Besides, all the recording layers of the five types of optical recording media of which the ratio of the number of O atoms in the recording layer reached or exceeded 66% had high light transmittances of around 80%. In the recording layers of which the ratio of the number of O atoms in them falling within the range of 63% to 73%, the difference between the light transmittances before and after the formation of recording marks was suppressed to around 2%. It is thus found that the recording layers of which the ratio of the number of O atoms in them falling within the range of 63% to 73% are suitable for the recording layers of optical recording media of multilayer recording type, having three or four recording layers, for example.

EXAMPLE 2

A plurality of optical recording mediums having the same configuration as that of the optical recording medium 60 according to the third exemplary embodiment and each having a recording layer in direct contact with the substrate and the cover layer 22 were produced. The compositions of the recording layers were different among the optical recording mediums. The recording layers 18 each had a thickness of 45 nm, and the configuration other than the recording layer was the same as that of the optical recording medium produced in Example 1.

More specifically, an optical recording medium having a recording layer composed only of Bi and O as given in Table 3, and optical recording mediums having recording layers composed of Bi, O, and M (an element selected from the group consisting of Mg, Y, Dy, Ce, Tb, Ti, Zr, V, Nb, Ta, Mo, W, Mn, Fe, Zn, Al, In, Si, Ge, Sn, and Sb) as given in Tables 4 to 24 were produced. For the optical recording mediums including M as given in Tables 4 to 24, different sputtering conditions were set for the respective M elements. In this way, the optical recording mediums having different composition ratios of Bi, O, and M were produced. Note that ten pieces were produced for each kind of the optical recording mediums.

TABLE 3

| Composition | | | Gas flow rate | | Recording characteristic | | | |
|---|---|---|---|---|---|---|---|---|
| | | | | | Before being left in high temperature and high humidity environment | | After being left in high temperature and high humidity environment | |
| Bi[at %] | O[at %] | Bi[W] | Ar[sccm] | O$_2$[sccm] | Recording power (mW) | 8T C/N (dB) | Recording power (mW) | 8T C/N (dB) |
| 27 | 73 | 200 | 50 | 25 | 6.5 | 53 | 12.0 | 43 |

TABLE 4

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| Bi[at %] | Mg[at %] | O[at %] | Bi/(Bi + M) | Mg[W] | Bi[W] | Ar[sccm] | O$_2$[sccm] | Recording power (mW) | 8T C/N (dB) | Recording power (mW) | 8T C/N (dB) |
| 35.7 | 0.4 | 63.9 | 99 | 100 | 200 | 50 | 13 | 6.0 | 52 | 7.0 | 50 |
| 23.4 | 0.4 | 76.2 | 98 | 200 | 200 | 50 | 50 | 5.0 | 49 | 10.0 | 47 |
| 29.4 | 1.7 | 68.9 | 95 | 200 | 200 | 50 | 15 | 5.0 | 55 | 6.0 | 53 |
| 21.6 | 3.6 | 74.8 | 86 | 400 | 200 | 50 | 50 | 7.0 | 55 | 8.0 | 49 |
| 29.8 | 7.6 | 62.6 | 80 | 400 | 200 | 50 | 10 | 6.0 | 56 | 8.0 | 53 |
| 22.2 | 14.0 | 63.8 | 61 | 800 | 200 | 50 | 15 | 6.0 | 58 | 7.0 | 54 |
| 18.9 | 19.0 | 62.1 | 50 | 1200 | 100 | 50 | 10 | 9.0 | 51 | 11.0 | 49 |
| 14.1 | 19.5 | 66.4 | 42 | 1200 | 100 | 50 | 25 | 10.0 | 51 | 12.0 | 48 |
| 16.8 | 19.7 | 63.5 | 46 | 1200 | 100 | 50 | 15 | 8.0 | 59 | 9.0 | 56 |
| 11.4 | 25.4 | 63.2 | 31 | 1200 | 75 | 50 | 25 | 10.0 | 42 | 12.0 | 31 |
| 12.0 | 28.5 | 59.5 | 30 | 1200 | 75 | 50 | 8 | 9.0 | 46 | 12.0 | 43 |

TABLE 5

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| Bi[at %] | Y[at %] | O[at %] | Bi/(Bi + M) | Y[W] | Bi[W] | Ar[sccm] | O$_2$[sccm] | Recording power (mW) | 8T C/N (dB) | Recording power (mW) | 8T C/N (dB) |
| 36.7 | 0.4 | 62.9 | 99 | 400 | 200 | 50 | 15 | 8.0 | 51 | 12.0 | 51 |
| 23.1 | 0.5 | 76.4 | 98 | 400 | 200 | 50 | 50 | 5.0 | 48 | 10.0 | 46 |
| 27.8 | 1.0 | 71.2 | 97 | 600 | 200 | 50 | 20 | 5.0 | 56 | 7.0 | 56 |
| 32.1 | 5.3 | 62.6 | 86 | 1200 | 200 | 50 | 12 | 7.5 | 56 | 11.0 | 53 |
| 15.1 | 15.4 | 69.5 | 50 | 1200 | 100 | 50 | 25 | 6.0 | 52 | 7.0 | 50 |
| 19.3 | 18.7 | 62.0 | 51 | 1200 | 100 | 50 | 12 | 9.0 | 56 | 11.0 | 53 |
| 13.1 | 18.8 | 68.1 | 41 | 1200 | 75 | 50 | 25 | 8.0 | 50 | 9.0 | 48 |
| 9.8 | 24.1 | 66.1 | 29 | 1400 | 75 | 50 | 20 | 8.0 | 41 | 11.0 | 36 |
| 11.5 | 27.9 | 60.6 | 29 | 1400 | 75 | 50 | 10 | 10.0 | 44 | 12.0 | 41 |

TABLE 6

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| | | | | | | | | Recording power | 8T C/N | Recording power | 8T C/N |
| Bi[at %] | Dy[at %] | O[at %] | Bi/(Bi + M) | Dy[W] | Bi[W] | Ar[sccm] | O$_2$[sccm] | (mW) | (dB) | (mW) | (dB) |
| 36.4 | 0.3 | 63.3 | 99 | 200 | 200 | 50 | 15 | 8.0 | 50 | 12.0 | 50 |
| 27.1 | 0.4 | 72.5 | 99 | 400 | 200 | 50 | 25 | 7.0 | 56 | 9.0 | 55 |
| 22.8 | 0.8 | 76.4 | 97 | 200 | 200 | 50 | 50 | 6.0 | 48 | 10.0 | 46 |
| 25.9 | 11.6 | 62.5 | 69 | 1000 | 200 | 50 | 13 | 7.5 | 52 | 9.0 | 52 |
| 16.4 | 13.1 | 70.5 | 56 | 1000 | 100 | 50 | 25 | 8.0 | 52 | 10.0 | 49 |
| 17.6 | 16.8 | 65.6 | 51 | 1200 | 200 | 50 | 15 | 8.0 | 57 | 10.0 | 56 |
| 19.1 | 18.4 | 62.5 | 51 | 1000 | 150 | 50 | 10 | 9.0 | 52 | 11.0 | 50 |
| 13.7 | 19.2 | 67.1 | 42 | 1200 | 50 | 50 | 25 | 9.0 | 50 | 11.0 | 48 |
| 10.1 | 23.0 | 66.9 | 31 | 1300 | 50 | 50 | 20 | 9.0 | 48 | 11.0 | 43 |
| 11.7 | 27.9 | 60.4 | 30 | 1400 | 75 | 50 | 10 | 10.0 | 43 | 12.7 | 39 |

TABLE 7

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| | | | | | | | | Recording power | 8T C/N | Recording power | 8T C/N |
| Bi[at %] | Ce[at %] | O[at %] | Bi/(Bi + M) | Ce[W] | Bi[W] | Ar[sccm] | O$_2$[sccm] | (mW) | (dB) | (mW) | (dB) |
| 35.4 | 0.4 | 64.2 | 99 | 100 | 200 | 50 | 12 | 8.0 | 48 | 12.0 | 50 |
| 24.6 | 0.4 | 75.0 | 98 | 200 | 200 | 50 | 15 | 5.0 | 53 | 7.0 | 53 |
| 22.8 | 0.4 | 76.8 | 98 | 200 | 200 | 50 | 50 | 4.0 | 49 | 10.0 | 46 |
| 32.9 | 3.5 | 63.6 | 90 | 400 | 200 | 50 | 12 | 9.0 | 51 | 9.0 | 49 |
| 19.3 | 10.9 | 69.8 | 64 | 400 | 200 | 50 | 20 | 4.5 | 51 | 12.0 | 51 |
| 14.3 | 12.7 | 73.0 | 53 | 400 | 200 | 50 | 50 | 5.0 | 50 | 8.0 | 49 |
| 11.6 | 18.2 | 70.2 | 39 | 800 | 50 | 50 | 25 | 5.0 | 48 | 9.0 | 46 |
| 17.3 | 17.1 | 65.6 | 50 | 800 | 200 | 50 | 12 | 9.0 | 51 | 9.0 | 49 |
| 8.3 | 21.9 | 69.8 | 27 | 1200 | 50 | 50 | 25 | 5.0 | 44 | 10.0 | 39 |
| 11.8 | 25.1 | 63.1 | 32 | 1200 | 100 | 50 | 10 | 9.0 | 43 | 12.0 | 34 |

TABLE 8

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| | | | | | | | | Recording power | 8T C/N | Recording power | 8T C/N |
| Bi[at %] | Tb[at %] | O[at %] | Bi/(Bi + M) | Tb[W] | Bi[W] | Ar[sccm] | O$_2$[sccm] | (mW) | (dB) | (mW) | (dB) |
| 36.4 | 0.3 | 63.3 | 99 | 200 | 200 | 50 | 12 | 8.0 | 48 | 12.0 | 45 |
| 22.8 | 0.6 | 76.6 | 97 | 800 | 200 | 50 | 50 | 4.5 | 48 | 11.0 | 47 |
| 28.8 | 0.8 | 70.4 | 97 | 200 | 200 | 50 | 15 | 5.0 | 57 | 7.0 | 56 |
| 24.0 | 6.5 | 69.5 | 79 | 1200 | 200 | 50 | 15 | 6.0 | 58 | 12.7 | 51 |
| 29.4 | 8.2 | 62.4 | 78 | 800 | 200 | 50 | 12 | 9.0 | 52 | 12.0 | 50 |
| 15.3 | 13.6 | 71.1 | 53 | 1200 | 100 | 50 | 50 | 9.0 | 52 | 12.7 | 50 |
| 19.9 | 17.1 | 63.0 | 54 | 1000 | 200 | 50 | 12 | 9.0 | 52 | 12.7 | 50 |
| 12.5 | 18.7 | 68.8 | 40 | 1400 | 100 | 50 | 25 | 9.0 | 49 | 12.7 | 48 |
| 14.1 | 23.6 | 62.3 | 37 | 1200 | 150 | 50 | 10 | 10.0 | 48 | 12.7 | 44 |
| 7.7 | 26.7 | 65.6 | 22 | 1400 | 50 | 50 | 25 | 9.0 | 46 | 12.7 | 42 |

TABLE 9

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| | | | | | | | | Recording power | 8T C/N | Recording power | 8T C/N |
| Bi[at %] | Ti[at %] | O[at %] | Bi/(Bi + M) | Ti[W] | Bi[W] | Ar[sccm] | O₂[sccm] | (mW) | (dB) | (mW) | (dB) |
| 22.9 | 0.4 | 76.7 | 98 | 800 | 200 | 50 | 50 | 4.5 | 50 | 10.0 | 49 |
| 36.2 | 0.5 | 63.3 | 99 | 400 | 200 | 50 | 12 | 10.0 | 50 | 12.0 | 48 |
| 27.0 | 0.5 | 72.5 | 98 | 400 | 200 | 50 | 20 | 4.5 | 56 | 6.0 | 54 |
| 29.0 | 0.7 | 70.3 | 98 | 400 | 200 | 50 | 15 | 4.5 | 57 | 6.0 | 57 |
| 33.8 | 2.2 | 64.0 | 94 | 600 | 200 | 50 | 12 | 6.5 | 53 | 8.0 | 53 |
| 33.2 | 3.1 | 63.7 | 91 | 1000 | 200 | 50 | 12 | 5.0 | 56 | 6.0 | 54 |
| 14.5 | 12.6 | 72.9 | 54 | 1200 | 150 | 50 | 20 | 4.5 | 54 | 11.0 | 49 |
| 14.7 | 14.1 | 71.2 | 51 | 1200 | 150 | 50 | 20 | 5.0 | 52 | 10.0 | 50 |
| 11.5 | 18.6 | 69.9 | 38 | 1200 | 100 | 50 | 15 | 5.0 | 52 | 12.7 | 46 |
| 17.7 | 17.2 | 65.1 | 51 | 1000 | 75 | 50 | 10 | 9.0 | 56 | 12.0 | 54 |
| 9.1 | 20.8 | 70.1 | 30 | 1200 | 50 | 50 | 15 | 5.0 | 42 | 12.0 | 40 |
| 8.8 | 27.1 | 64.1 | 25 | 1200 | 50 | 50 | 10 | 9.0 | 44 | 12.0 | 42 |

TABLE 10

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| | | | | | | | | Recording power | 8T C/N | Recording power | 8T C/N |
| Bi[at %] | Zr[at %] | O[at %] | Bi/(Bi + M) | Zr[W] | Bi[W] | Ar[sccm] | O₂[sccm] | (mW) | (dB) | (mW) | (dB) |
| 35.7 | 0.5 | 63.8 | 99 | 400 | 200 | 50 | 10 | 9.0 | 50 | 12.0 | 45 |
| 23.2 | 0.5 | 76.3 | 98 | 200 | 200 | 50 | 50 | 7.0 | 51 | 9.0 | 48 |
| 26.6 | 1.8 | 71.6 | 94 | 400 | 200 | 50 | 20 | 4.5 | 52 | 10.0 | 47 |
| 28.1 | 2.7 | 69.2 | 91 | 400 | 200 | 50 | 15 | 5.0 | 57 | 7.0 | 57 |
| 15.9 | 11.8 | 72.3 | 57 | 1000 | 200 | 50 | 25 | 10.0 | 52 | 12.0 | 50 |
| 20.1 | 15.1 | 64.8 | 57 | 1200 | 200 | 50 | 12 | 10.0 | 53 | 12.0 | 50 |
| 11.4 | 18.3 | 70.3 | 38 | 1200 | 100 | 50 | 25 | 10.0 | 50 | 12.0 | 49 |
| 18.0 | 17.1 | 64.9 | 51 | 1400 | 100 | 50 | 10 | 10.0 | 50 | 12.0 | 45 |
| 7.5 | 22.7 | 69.8 | 25 | 1200 | 100 | 50 | 25 | 10.0 | 43 | 12.0 | 33 |
| 9.1 | 28.1 | 62.8 | 24 | 1400 | 50 | 50 | 9 | 10.0 | 44 | 12.0 | 37 |

TABLE 11

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| | | | | | | | | Recording power | 8T C/N | Recording power | 8T C/N |
| Bi[at %] | V[at %] | O[at %] | Bi/(Bi + M) | V[W] | Bi[W] | Ar[sccm] | O₂[sccm] | (mW) | (dB) | (mW) | (dB) |
| 36.2 | 0.3 | 63.5 | 99 | 100 | 200 | 50 | 13 | 7.5 | 48 | 11.0 | 45 |
| 23.0 | 0.5 | 76.5 | 98 | 100 | 200 | 50 | 50 | 6.0 | 50 | 8.0 | 50 |
| 32.3 | 1.7 | 66.0 | 95 | 200 | 200 | 50 | 15 | 5.0 | 53 | 6.0 | 53 |
| 21.7 | 2.2 | 76.1 | 91 | 400 | 200 | 50 | 50 | 6.5 | 54 | 8.0 | 53 |
| 22.5 | 7.8 | 69.7 | 74 | 800 | 100 | 50 | 15 | 7.0 | 55 | 9.0 | 55 |
| 26.8 | 8.3 | 64.9 | 76 | 600 | 150 | 50 | 12 | 4.0 | 54 | 7.0 | 52 |
| 16.5 | 10.5 | 73.0 | 61 | 600 | 150 | 50 | 50 | 9.5 | 51 | 12.0 | 50 |
| 21.1 | 12.5 | 66.4 | 63 | 800 | 100 | 50 | 12 | 5.0 | 52 | 8.0 | 46 |
| 9.0 | 21.1 | 69.9 | 30 | 800 | 50 | 50 | 10 | 9.0 | 35 | 10.0 | 43 |

TABLE 12

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| | | | | | | | | Recording power | 8T C/N | Recording power | 8T C/N |
| Bi[at %] | Nb[at %] | O[at %] | Bi/(Bi + M) | Nb[W] | Bi[W] | Ar[sccm] | $O_2$[sccm] | (mW) | (dB) | (mW) | (dB) |
| 36.7 | 0.3 | 63.0 | 99 | 100 | 200 | 50 | 15 | 8.0 | 49 | 12.0 | 48 |
| 23.5 | 0.5 | 76.0 | 98 | 100 | 200 | 50 | 50 | 5.0 | 47 | 8.0 | 46 |
| 27.8 | 2.2 | 70.0 | 93 | 200 | 200 | 50 | 20 | 6.5 | 56 | 8 | 56 |
| 20.6 | 4.2 | 75.2 | 83 | 400 | 200 | 50 | 50 | 5.0 | 53 | 6.0 | 49 |
| 31.2 | 4.8 | 64.0 | 87 | 400 | 200 | 50 | 15 | 5.0 | 52 | 5.5 | 52 |
| 24.8 | 19.5 | 65.7 | 56 | 600 | 200 | 50 | 18 | 5.0 | 51 | 8.0 | 51 |
| 15.8 | 11.2 | 73.0 | 59 | 800 | 150 | 50 | 50 | 6.0 | 53 | 7.0 | 50 |
| 20.4 | 13.0 | 66.6 | 61 | 800 | 100 | 50 | 13 | 6.0 | 48 | 7.0 | 48 |
| 11.5 | 20.1 | 68.4 | 36 | 800 | 50 | 50 | 25 | 12.0 | 35 | 12.0 | 25 |
| 9.5 | 23.1 | 67.4 | 29 | 800 | 50 | 50 | 13 | 11.0 | 36 | 12.0 | 0 |

TABLE 13

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| | | | | | | | | Recording power | 8T C/N | Recording power | 8T C/N |
| Bi[at %] | Ta[at %] | O[at %] | Bi/(Bi + M) | Ta[W] | Bi[W] | Ar[sccm] | $O_2$[sccm] | (mW) | (dB) | (mW) | (dB) |
| 35.7 | 0.2 | 64.1 | 99 | 100 | 200 | 50 | 18 | 8.0 | 48 | 7.5 | 47 |
| 23.6 | 0.7 | 75.7 | 97 | 100 | 200 | 50 | 50 | 4.5 | 49 | 5.5 | 49 |
| 25.5 | 1.1 | 73.4 | 96 | 200 | 200 | 50 | 25 | 5.0 | 54 | 6.0 | 51 |
| 19.6 | 4.6 | 75.8 | 81 | 300 | 200 | 50 | 50 | 5.5 | 54 | 8.0 | 50 |
| 30.6 | 4.9 | 64.5 | 86 | 300 | 200 | 50 | 18 | 5.0 | 51 | 5.5 | 52 |
| 24.2 | 8.2 | 67.6 | 75 | 600 | 200 | 50 | 20 | 5.5 | 55 | 5.5 | 55 |
| 15.8 | 10.1 | 74.1 | 61 | 600 | 150 | 50 | 50 | 7.0 | 53 | 10.0 | 50 |
| 18.9 | 14.3 | 66.8 | 57 | 600 | 100 | 50 | 15 | 6.0 | 50 | 7.0 | 53 |
| 17.1 | 20.1 | 62.8 | 46 | 600 | 50 | 50 | 15 | 9.5 | 44 | 12.0 | 31 |
| 10.3 | 21.0 | 68.7 | 33 | 600 | 50 | 50 | 25 | 12.0 | 27 | 12.0 | 0 |

TABLE 14

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| | | | | | | | | Recording power | 8T C/N | Recording power | 8T C/N |
| Bi[at %] | Mo[at %] | O[at %] | Bi/(Bi + M) | Mo[W] | Bi[W] | Ar[sccm] | $O_2$[sccm] | (mW) | (dB) | (mW) | (dB) |
| 36.1 | 0.4 | 63.5 | 99 | 100 | 200 | 50 | 18 | 7.0 | 49 | 8.5 | 48 |
| 22.6 | 0.6 | 76.8 | 97 | 100 | 200 | 50 | 50 | 6.0 | 48 | 10.0 | 47 |
| 25.1 | 2.2 | 72.7 | 92 | 600 | 200 | 50 | 20 | 7.0 | 54 | 9.0 | 54 |
| 30.1 | 5.1 | 64.8 | 86 | 300 | 200 | 50 | 18 | 6.0 | 51 | 8.5 | 49 |
| 19.6 | 5.8 | 74.6 | 77 | 300 | 200 | 50 | 50 | 7.0 | 53 | 6.0 | 51 |
| 23.6 | 91 | 67.3 | 72 | 600 | 200 | 50 | 20 | 6.0 | 52 | 8.0 | 53 |
| 16.5 | 9.8 | 73.7 | 63 | 600 | 150 | 50 | 50 | 8.0 | 51 | 10.0 | 53 |
| 19.3 | 12.1 | 68.6 | 61 | 400 | 100 | 50 | 15 | 6.0 | 49 | 9.5 | 46 |
| 6.5 | 20.5 | 73.0 | 24 | 600 | 50 | 50 | 25 | 11.0 | 44 | 12.0 | 41 |
| 13.5 | 18.2 | 68.3 | 43 | 600 | 50 | 50 | 15 | 10.0 | 52 | 12.0 | 35 |

TABLE 15

| Composition | | | | Deposition power | | Gas flow rate | | Recording characteristic |||| 
| | | | | | | | | Before being left in high temperature and high humidity environment || After being left in high temperature and high humidity environment ||
| Bi[at %] | W[at %] | O[at %] | Bi/(Bi + M) | W[W] | Bi[W] | Ar[sccm] | O₂[sccm] | Recording power (mW) | 8T C/N (dB) | Recording power (mW) | 8T C/N (dB) |
|---|---|---|---|---|---|---|---|---|---|---|---|
| 23.5 | 0.5 | 76.0 | 98 | 100 | 200 | 50 | 50 | 6.0 | 48 | 10.0 | 49 |
| 36.9 | 0.6 | 62.5 | 98 | 100 | 200 | 50 | 18 | 7.0 | 49 | 8.5 | 48 |
| 31.4 | 4.1 | 64.5 | 88 | 400 | 200 | 50 | 18 | 6.0 | 51 | 7.0 | 51 |
| 27.1 | 4.5 | 68.4 | 86 | 400 | 200 | 50 | 20 | 5.0 | 52 | 6.0 | 52 |
| 19.1 | 4.9 | 76.0 | 80 | 200 | 200 | 50 | 50 | 7.0 | 53 | 6.0 | 50 |
| 19.6 | 7.2 | 73.2 | 73 | 400 | 200 | 50 | 20 | 7.0 | 53 | 9.0 | 52 |
| 14.1 | 10.6 | 75.3 | 57 | 400 | 150 | 50 | 50 | 8.0 | 51 | 10.0 | 50 |
| 17.0 | 13.1 | 69.9 | 56 | 400 | 100 | 50 | 15 | 6.0 | 49 | 7.5 | 48 |
| 4.1 | 21.5 | 74.4 | 16 | 400 | 50 | 50 | 15 | 9.0 | 47 | 11.0 | 30 |
| 8.0 | 20.1 | 71.9 | 28 | 400 | 50 | 50 | 25 | 8.0 | 44 | 12.0 | 30 |

TABLE 16

| Composition | | | | Deposition power | | Gas flow rate | | Recording characteristic |||| 
| | | | | | | | | Before being left in high temperature and high humidity environment || After being left in high temperature and high humidity environment ||
| Bi[at %] | Mn[at %] | O[at %] | Bi/(Bi + M) | Mn[W] | Bi[W] | Ar[sccm] | O₂[sccm] | Recording power (mW) | 8T C/N (dB) | Recording power (mW) | 8T C/N (dB) |
|---|---|---|---|---|---|---|---|---|---|---|---|
| 33.8 | 0.4 | 65.8 | 99 | 100 | 200 | 50 | 10 | 4.5 | 48 | 6.0 | 46 |
| 23.0 | 0.4 | 76.6 | 98 | 100 | 200 | 50 | 50 | 5.5 | 50 | 12.0 | 50 |
| 21.1 | 5.6 | 73.3 | 79 | 200 | 200 | 50 | 50 | 6.0 | 54 | 8.0 | 50 |
| 28.0 | 6.1 | 65.9 | 82 | 200 | 200 | 50 | 13 | 5.0 | 54 | 6.0 | 53 |
| 25.1 | 10.3 | 64.6 | 71 | 400 | 150 | 50 | 10 | 4.5 | 51 | 7.0 | 51 |
| 20.0 | 12.5 | 67.5 | 62 | 600 | 200 | 50 | 17 | 7.0 | 54 | 10.0 | 52 |
| 12.8 | 18.0 | 69.8 | 42 | 600 | 100 | 50 | 25 | 7.0 | 51 | 9.0 | 49 |
| 16.9 | 18.5 | 64.6 | 48 | 400 | 100 | 50 | 11 | 5.0 | 48 | 8.0 | 47 |
| 10.1 | 24.1 | 65.8 | 30 | 600 | 75 | 50 | 25 | 8.0 | 25 | 12.0 | 27 |
| 11.8 | 27.4 | 60.8 | 30 | 600 | 75 | 50 | 11 | 7.0 | 35 | 10.0 | 34 |

TABLE 17

| Composition | | | | Deposition power | | Gas flow rate | | Recording characteristic |||| 
| | | | | | | | | Before being left in high temperature and high humidity environment || After being left in high temperature and high humidity environment ||
| Bi[at %] | Fe[at %] | O[at %] | Bi/(Bi + M) | Fe[W] | Bi[W] | Ar[sccm] | O₂[sccm] | Recording power (mW) | 8T C/N (dB) | Recording power (mW) | 8T C/N (dB) |
|---|---|---|---|---|---|---|---|---|---|---|---|
| 32.7 | 0.4 | 66.9 | 99 | 100 | 200 | 50 | 15 | 5.0 | 55 | 6.5 | 56 |
| 23.1 | 0.4 | 76.5 | 98 | 100 | 200 | 50 | 50 | 4.0 | 50 | 10.0 | 47 |
| 35.7 | 0.5 | 63.8 | 99 | 100 | 200 | 50 | 12 | 4.0 | 48 | 7.0 | 45 |
| 25.1 | 3.3 | 71.6 | 88 | 100 | 200 | 50 | 20 | 4.0 | 53 | 7.5 | 55 |
| 29.1 | 7.2 | 63.7 | 80 | 400 | 200 | 50 | 12 | 3.5 | 51 | 7.0 | 53 |
| 18.5 | 9.2 | 72.3 | 67 | 400 | 200 | 50 | 50 | 4.0 | 52 | 9.0 | 45 |
| 16.2 | 14.2 | 69.6 | 53 | 800 | 75 | 50 | 13 | 4.0 | 53 | 7.0 | 53 |
| 19.6 | 16.7 | 63.7 | 54 | 800 | 75 | 50 | 10 | 4.5 | 58 | 6.5 | 57 |
| 12.6 | 18.4 | 69.0 | 41 | 600 | 100 | 50 | 25 | 5.0 | 52 | 9.0 | 49 |
| 18.1 | 19.8 | 62.1 | 48 | 800 | 100 | 50 | 12 | 5.5 | 50 | 8.0 | 49 |
| 9.2 | 24.1 | 66.7 | 28 | 600 | 75 | 50 | 25 | 7.5 | 47 | 11.0 | 41 |
| 11.1 | 28.7 | 60.2 | 28 | 800 | 75 | 50 | 10 | 7.0 | 46 | 10.0 | 43 |

TABLE 18

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| Bi[at %] | Zn[at %] | O[at %] | Bi/(Bi + M) | Zn[W] | Bi[W] | Ar[sccm] | O$_2$[sccm] | Recording power (mW) | 8T C/N (dB) | Recording power (mW) | 8T C/N (dB) |
| 23.1 | 0.5 | 76.4 | 98 | 100 | 200 | 50 | 50 | 4.5 | 49 | 10.0 | 49 |
| 35.7 | 0.7 | 63.6 | 98 | 150 | 200 | 50 | 12 | 4.5 | 48 | 6.0 | 48 |
| 21.5 | 5.3 | 73.2 | 80 | 400 | 200 | 50 | 50 | 7.5 | 52 | 9.0 | 51 |
| 30.5 | 7.4 | 62.1 | 80 | 800 | 200 | 50 | 12 | 8.0 | 50 | 7.0 | 49 |
| 23.6 | 7.7 | 68.7 | 75 | 600 | 200 | 50 | 20 | 8.0 | 53 | 11.0 | 52 |
| 18.5 | 10.8 | 70.7 | 63 | 800 | 75 | 50 | 25 | 10.0 | 50 | 12.0 | 49 |
| 26.3 | 10.9 | 62.8 | 71 | 800 | 200 | 50 | 15 | 5.5 | 53 | 5.5 | 53 |
| 24.6 | 13.3 | 62.1 | 65 | 1000 | 100 | 50 | 12 | 10.0 | 48 | 8.0 | 47 |
| 14.1 | 20.3 | 65.6 | 41 | 1000 | 75 | 50 | 25 | 12.0 | 47 | 12.0 | 33 |
| 20.1 | 23.2 | 56.7 | 46 | 1000 | 75 | 50 | 10 | 11.0 | 47 | 10.0 | 43 |

TABLE 19

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| Bi[at %] | Al[at %] | O[at %] | Bi/(Bi + M) | Al[W] | Bi[W] | Ar[sccm] | O$_2$[sccm] | Recording power (mW) | 8T C/N (dB) | Recording power (mW) | 8T C/N (dB) |
| 23.1 | 0.4 | 76.5 | 98 | 200 | 200 | 50 | 50 | 4.0 | 47 | 10.0 | 46 |
| 35.7 | 0.6 | 63.7 | 98 | 400 | 200 | 50 | 12 | 7.0 | 51 | 7.5 | 50 |
| 30.5 | 0.8 | 68.7 | 97 | 400 | 200 | 50 | 15 | 5.0 | 55 | 6.0 | 57 |
| 24.5 | 0.8 | 74.7 | 97 | 400 | 200 | 50 | 25 | 5.0 | 55 | 7.5 | 50 |
| 21.5 | 3.5 | 75.0 | 86 | 600 | 200 | 50 | 50 | 5.0 | 48 | 8.0 | 47 |
| 29.6 | 7.6 | 62.8 | 80 | 800 | 200 | 50 | 12 | 9.0 | 51 | 9.5 | 53 |
| 18.6 | 9.2 | 72.2 | 67 | 1000 | 100 | 50 | 25 | 6.0 | 46 | 9.0 | 46 |
| 20.4 | 9.3 | 70.3 | 69 | 1000 | 200 | 50 | 25 | 5.0 | 50 | 12.5 | 50 |
| 22.4 | 10.8 | 66.8 | 67 | 1600 | 200 | 50 | 15 | 5.0 | 59 | 5.5 | 58 |
| 25.1 | 12.7 | 62.2 | 66 | 1000 | 150 | 50 | 10 | 11.0 | 52 | 11.0 | 50 |
| 18.0 | 20.1 | 61.9 | 47 | 1200 | 50 | 50 | 9 | 12.0 | 31 | 12.0 | 0 |
| 10.6 | 22.2 | 67.2 | 32 | 1200 | 75 | 50 | 25 | 12.0 | 44 | 12.0 | 26 |

TABLE 20

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| Bi[at %] | In[at %] | O[at %] | Bi/(Bi + M) | In[W] | Bi[W] | Ar[sccm] | O$_2$[sccm] | Recording power (mW) | 8T C/N (dB) | Recording power (mW) | 8T C/N (dB) |
| 35.7 | 0.4 | 63.9 | 99 | 50 | 200 | 50 | 12 | 8.0 | 46 | 9.0 | 46 |
| 23.6 | 0.4 | 76.0 | 98 | 50 | 200 | 50 | 50 | 5.0 | 47 | 10.0 | 46 |
| 19.3 | 7.1 | 73.6 | 73 | 75 | 200 | 50 | 50 | 5.0 | 48 | 9.0 | 46 |
| 30.1 | 7.8 | 62.1 | 79 | 100 | 200 | 50 | 12 | 9.0 | 52 | 11.0 | 50 |
| 17.8 | 9.3 | 72.9 | 66 | 100 | 100 | 50 | 50 | 6.0 | 46 | 10.0 | 45 |
| 24.5 | 13.1 | 62.4 | 65 | 100 | 100 | 50 | 10 | 11.0 | 47 | 12.0 | 45 |
| 17.1 | 20.6 | 62.3 | 45 | 200 | 50 | 50 | 10 | 12.0 | 39 | 12.0 | 34 |
| 12.1 | 24.1 | 63.8 | 33 | 200 | 75 | 50 | 25 | 9.0 | 39 | 11.0 | 36 |

TABLE 21

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| | | | | | | | | Recording power | 8T C/N | Recording power | 8T C/N |
| Bi[at %] | Si[at %] | O[at %] | Bi/(Bi + M) | Si[W] | Bi[W] | Ar[sccm] | O$_2$[sccm] | (mW) | (dB) | (mW) | (dB) |
| 37.5 | 0.3 | 62.2 | 99 | 100 | 200 | 50 | 13 | 8.0 | 47 | 11.0 | 45 |
| 24.7 | 0.4 | 74.9 | 98 | 400 | 150 | 50 | 18 | 7.0 | 52 | 10.0 | 50 |
| 23.1 | 0.4 | 76.5 | 98 | 100 | 200 | 50 | 50 | 6.0 | 50 | 12.0 | 46 |
| 33.7 | 0.6 | 65.7 | 98 | 800 | 100 | 50 | 12 | 6.0 | 53 | 7.0 | 55 |
| 21.0 | 4.1 | 74.9 | 84 | 800 | 200 | 50 | 50 | 8.0 | 55 | 10.0 | 49 |
| 30.2 | 6.1 | 63.7 | 83 | 600 | 200 | 50 | 13 | 5.0 | 53 | 7.0 | 51 |
| 17.1 | 8.6 | 74.3 | 67 | 800 | 150 | 50 | 25 | 10.0 | 52 | 12.0 | 46 |
| 19.1 | 8.8 | 72.1 | 68 | 600 | 200 | 50 | 13 | 9.0 | 55 | 10.0 | 50 |
| 22.6 | 11.7 | 65.7 | 66 | 800 | 150 | 50 | 15 | 8.0 | 54 | 9.5 | 55 |
| 21.0 | 13.1 | 65.9 | 62 | 800 | 100 | 50 | 12 | 7.5 | 51 | 8.5 | 48 |
| 11.6 | 20.5 | 67.9 | 36 | 800 | 50 | 50 | 15 | 12.0 | 30 | 12.0 | 0.0 |
| 15.4 | 22.5 | 62.1 | 41 | 800 | 50 | 50 | 11 | 12.0 | 41 | 12.0 | 20 |

TABLE 22

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| | | | | | | | | Recording power | 8T C/N | Recording power | 8T C/N |
| Bi[at %] | Ge[at %] | O [at %] | Bi/(Bi + M) | Ge[W] | Bi[W] | Ar[sccm] | O$_2$[sccm] | (mW) | (dB) | (mW) | (dB) |
| 36.1 | 0.4 | 63.5 | 99 | 100 | 200 | 50 | 13 | 7.5 | 47 | 12.0 | 47 |
| 24.5 | 0.4 | 75.1 | 98 | 100 | 150 | 50 | 18 | 7.0 | 54 | 10 | 54 |
| 33.4 | 0.6 | 66.0 | 98 | 100 | 150 | 50 | 12 | 6.0 | 54 | 7.0 | 54 |
| 23.4 | 0.7 | 75.9 | 97 | 125 | 200 | 50 | 50 | 5.5 | 48 | 11.0 | 46 |
| 19.4 | 5.7 | 74.9 | 77 | 200 | 200 | 50 | 50 | 7.5 | 53 | 10.0 | 48 |
| 28.1 | 8.1 | 63.8 | 78 | 250 | 150 | 50 | 13 | 5.0 | 51 | 8.0 | 50 |
| 17.3 | 8.4 | 74.3 | 67 | 250 | 150 | 50 | 50 | 9.0 | 50 | 12.0 | 46 |
| 19.0 | 10.5 | 70.5 | 64 | 250 | 100 | 50 | 13 | 10.0 | 56 | 11.0 | 56 |
| 22.6 | 11.1 | 66.3 | 67 | 250 | 100 | 50 | 15 | 9.0 | 53 | 11 | 54 |
| 22.3 | 13.7 | 64.0 | 62 | 250 | 75 | 50 | 12 | 7.0 | 47 | 9.5 | 46 |
| 12.9 | 20.6 | 66.5 | 39 | 250 | 50 | 50 | 15 | 12.0 | 33 | 12.0 | 14 |
| 17.1 | 21.0 | 61.9 | 45 | 250 | 50 | 50 | 10 | 12.0 | 0.0 | 12.0 | 0.0 |

TABLE 23

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| | | | | | | | | Recording power | 8T C/N | Recording power | 8T C/N |
| Bi[at %] | Sn[at %] | O [at %] | Bi/(Bi + M) | Sn[W] | Bi[W] | Ar[sccm] | O$_2$[sccm] | (mW) | (dB) | (mW) | (dB) |
| 22.6 | 0.6 | 76.8 | 97 | 75 | 200 | 50 | 50 | 4.0 | 48 | 11.0 | 47 |
| 35.6 | 0.8 | 63.6 | 98 | 75 | 200 | 50 | 15 | 8.0 | 47 | 11.0 | 47 |
| 25.1 | 3.6 | 71.3 | 87 | 100 | 200 | 50 | 20 | 6.0 | 53 | 9.0 | 53 |
| 20.4 | 4.1 | 75.5 | 83 | 150 | 200 | 50 | 50 | 6.0 | 50 | 8.0 | 49 |
| 30.3 | 6.4 | 63.3 | 83 | 150 | 200 | 50 | 15 | 5.0 | 49 | 8.0 | 49 |
| 24.6 | 7.4 | 68.0 | 77 | 200 | 200 | 50 | 18 | 5.5 | 51 | 6.5 | 51 |

TABLE 23-continued

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| | | | | | | | | Recording power | 8T C/N | Recording power | 8T C/N |
| Bi[at %] | Sn[at %] | O [at %] | Bi/(Bi + M) | Sn[W] | Bi[W] | Ar[sccm] | O₂[sccm] | (mW) | (dB) | (mW) | (dB) |
| 17.5 | 9.5 | 73.0 | 65 | 200 | 200 | 50 | 25 | 9.0 | 50 | 12.0 | 47 |
| 23.0 | 12.5 | 64.5 | 65 | 300 | 150 | 50 | 13 | 6.0 | 48 | 8.0 | 47 |
| 14.6 | 20.6 | 64.8 | 41 | 300 | 100 | 50 | 12 | 9.0 | 44 | 10.0 | 42 |
| 11.5 | 20.9 | 67.6 | 35 | 300 | 75 | 50 | 15 | 12.0 | 37 | 12.0 | 26 |

TABLE 24

| Composition | | | | Deposition power | | Gas flow rate | | Recording characteristic | | | |
|---|---|---|---|---|---|---|---|---|---|---|---|
| | | | | | | | | Before being left in high temperature and high humidity environment | | After being left in high temperature and high humidity environment | |
| | | | | | | | | Recording power | 8T C/N | Recording power | 8T C/N |
| Bi[at %] | Sb[at %] | O [at %] | Bi/(Bi + M) | Sb[W] | Bi[W] | Ar[sccm] | O₂[sccm] | (mW) | (dB) | (mW) | (dB) |
| 35.6 | 0.3 | 64.1 | 99 | 75 | 200 | 50 | 15 | 8.0 | 48 | 11.0 | 47 |
| 23.5 | 0.5 | 76.0 | 98 | 75 | 200 | 50 | 50 | 4.0 | 48 | 10.0 | 46 |
| 30.7 | 1.7 | 67.6 | 95 | 100 | 200 | 50 | 18 | 6.0 | 54 | 7.0 | 54 |
| 21.0 | 3.5 | 75.5 | 86 | 150 | 200 | 50 | 50 | 7.0 | 53 | 9.0 | 50 |
| 32.1 | 4.5 | 63.4 | 88 | 150 | 200 | 50 | 15 | 6.0 | 52 | 9.0 | 51 |
| 22.8 | 5.4 | 71.8 | 81 | 200 | 200 | 50 | 20 | 8.0 | 56 | 9.0 | 56 |
| 18.0 | 9.6 | 72.4 | 65 | 200 | 200 | 50 | 25 | 10.0 | 51 | 12.0 | 49 |
| 24.1 | 10.1 | 65.8 | 70 | 300 | 150 | 50 | 13 | 7.0 | 51 | 10.0 | 49 |
| 12.1 | 20.3 | 67.6 | 37 | 300 | 75 | 50 | 15 | 12.0 | 31 | 12.0 | 15 |
| 15.2 | 22.2 | 62.6 | 41 | 300 | 100 | 50 | 12 | 12.0 | 25 | 12.0 | 10 |

The optical recording mediums were each irradiated with laser light having a wavelength of approx. 405 nm after they were produced (without being left to stand in a high temperature and high humidity environment), then a recording mark having a length of 8 T was formed, and the C/N value of a signal thereof was measured.

Next, these different kinds of optical recording mediums were kept in a high temperature and high humidity environment, i.e., at a temperature of 80° C. and a relative humidity of 85% for about 50 hours, and then irradiated with laser light having a wavelength of approx. 405 nm at their non-recorded parts, and a recording mark having a length of 8 T was formed. Then, the C/N value of a signal thereof was measured. The average of the C/N values for 8 T for the ten optical recording mediums of each kind are given in Tables 3 to 24.

As shown in Table 3, for the optical recording medium having a recording layer composed only of Bi and O, the C/N value for the 8 T recording mark recorded before the medium was kept in the high humidity environment was more than 50 dB, in other words, the recording characteristic was good. However, the C/N value for the 8 T recording mark formed after the medium was kept in the high humidity environment was less than 45 dB, in other words, the recording characteristic was not good enough. This is probably because the recording layer was in direct contact with the substrate and cover layer with no dielectric layer capable of shielding water provided on either side of the recording layer, and the recording layer was deteriorated by the water transmitted through the substrate or cover layer in the high temperature and high humidity environment.

In contrast, as given in Tables 4 to 24, in the optical recording mediums having a recording layer including M, the difference between the C/N values for the 8 T recording marks formed before and after the mediums were kept in the high humidity environment was small, and it was confirmed that the preservation characteristic was good.

Note that as given in Tables 4 to 24, it has been found that when a material including M is used for the recording layer, and the ratio of M is excessive, the C/N value for 8 T is sometimes less than 45 dB, and if the ratio of the total number of the Bi and O atoms to the total number of the Bi, O, and M atoms is 80% or higher, a C/N value for 8 T of 45 dB or more can surely be obtained.

Preferably, in the relation between Bi and M, the ratio of the number of the Bi atoms to the total number of the Bi and M atoms is 42% or higher when M is a group 2 element (Mg), 39% or higher when M is a group 3 element (Y, Dy, Ce, or Tb), 38% or higher when M is a group 4 element (Ti, Zr), and 56% or higher when M is a group 5 or 6 element (V, Nb, Ta, Mo, or W). The ratio is 41% or higher when M is a group 7 or 8 element (Mn or Fe), 63% or higher when M is a group 12 element (Zn), 65% or higher when M is a group 13 element (Al or In), and 62% or higher when M is any of group 14 to 16 elements (Si, Ge, Sn, or Sb).

In this way, by adding M to Bi and O, the preservation characteristic can be improved. Therefore, an optical recording medium with a good preservation characteristic can be produced less costly in a simple configuration in which a dielectric layer is not present on either side of a recording layer and the recording layer is in direct contact with the substrate and the cover layer.

Here, brief description will be given of the method of measuring the light transmittance. In specific terms, an optical thickness measuring system ETA-RT (from Steag ETA-OPTIK GmbH) is used to irradiate a recording layer with laser light and measure it for absorptance. The light transmittance is calculated from this absorptance. In view of the effect of surface reflection, the value of the light transmittance is determined excluding that effect. More specifically, the light transmittance is calculated by the following equation:

light transmittance=100−reflectance−absorptance (including diffusion and refraction)

Here, the reflectance is measured by using the optical recording medium evaluation system DDU 1000 mentioned above.

Next, description will be given of the method of measuring the recording layers for the ratio of the numbers of atoms of Bi, O and M inside. The ratio of the numbers of atoms of Bi and O in the recording layers of the optical recording media was measured by using samples that were made for composition analysis. Specifically, a plurality of Si substrates having a thickness of 0.5 mm were prepared. These Si substrates were placed in a sputtering system one by one. Recording layers were formed on the respective Si substrates to a thickness of 200 nm while the deposition power of the Bi target and M target and the flow rates of the Ar gas and $O_2$ gas were adjusted to the conditions shown in Table 2 and Table 4 to 24 as in fabricating the plurality of optical recording media described above.

Next, an X-ray fluorescence analysis system RIX2000 (from Rigaku Corporation) was used to measure the recording layers for Bi and O contents by a fundamental parameter (FP) method. For the Bi measurement, X-rays were generated by setting the tube voltage of the Rh tube at 40 kV and the tube current at 30 mA. For the O measurement, X-rays were generated by setting the tube voltage of the Rh tube at 30 kV and the tube current at 120 mA. Here, Al was used as the primary X-ray filter. The characteristic X-rays for Bi were Bi-L α rays, and the characteristic X-rays for O were O—K α rays. Optimum characteristic X-rays were used for the additive element M. The device sensitivity correction constant for the additive element M was obtained using a bulk sample as a standard sample. The FP method requires system sensitivity correction coefficients. For Bi, Bi bulk was used as a reference sample. For O, a sample made by briquetting was prepared. Here, an Al ring having an inner diameter of 30 mm, a height of 4 mm, and a thickness of 2 mm was used as a protective ring. Powder $Bi_2O_3$ (from Japan Pure Chemical Co., Ltd.) was placed in this ring, and pressed under 147000 N or so to make a briquette of approximately 2 mm. The system sensitivity correction coefficients were 1.20270 for Bi, and 0.299447 for O.

What is claimed is:

1. An optical recording medium comprising:
    a substrate; and
    a recording layer formed over the substrate and having its optical characteristic changed by irradiation of laser light, the recording layer being substantially composed of Bi and O, the ratio of the number of the O atoms to the total number of Bi and O atoms in the recording layer being within a range of 63% to 73%.

2. The optical recording medium according to claim 1, wherein
    the recording layer comprises at least one element selected from the group consisting of Mg, Ca, Y, Dy, Ce, Tb, Ti, Zr, V, Nb, Ta, Mo, W, Mn, Fe, Zn, Al, In, Si, Ge, Sn, Sb, Li, Na, K, Sr, Ba, Sc, La, Nd, Sm, Gd, Ho, Cr, Co, Ni, Cu, Ga, and Pb.

3. An optical recording medium comprising:
    a substrate; and
    a recording layer formed over the substrate and having its optical characteristic changed by irradiation of laser light, the recording layer being substantially composed of Bi, O, and M, the M being at least one element selected from the group consisting of Mg, Ca, Y, Dy, Ce, Tb, Ti, Zr, V, Nb, Ta, Mo, W, Mn, Fe, Zn, Al, In, Si, Ge, Sn, Sb, Li, Na, K, Sr, Ba, Sc, La, Nd, Sm, Gd, Ho, Cr, Co, Ni, Cu, Ga, and Pb,
    a ratio of total number of the Bi and 0 atoms to total number of the Bi, O, and M atoms being 80% or higher,
    a ratio of the numbers of the Bi, O, and M atoms being in the range represented by the following expression:

$$73 \geq \{[O-(M \times \alpha/2)]/[Bi+O-(M \times \alpha/2)]\} \times 100 \geq 63$$

where α is a valence of the M.

4. An optical recording medium comprising:
    a substrate; and
    a recording layer formed over the substrate and having its optical characteristic changed by irradiation of laser light, the recording layer being composed of Bi, O, and M, the M being at least one element except Bi and O,
    a ratio of number of the Bi atoms to number of the Bi and M atoms being 50% or higher,
    a ratio of numbers of the Bi, O, and M atoms being in the range represented by the following expression:

$$73 \geq \{[O-(M \times \alpha/2)]/[Bi+O-(M \times \alpha/2)]\} \times 100 \geq 63$$

where α is a valence of the M.

5. The optical recording medium according to claim 1, wherein
    tracks for forming the recording mark are formed at track pitches within a range of 0.1 to 0.5 μm.

6. The optical recording medium according to claim 2, wherein
    tracks for forming the recording mark are formed at track pitches within a range of 0.1 to 0.5 μm.

7. The optical recording medium according to claim 3, wherein
    tracks for forming the recording mark are formed at track pitches within a range of 0.1 to 0.5 μm.

8. The optical recording medium according to claim 1, further comprising
    a spacer layer, and wherein
    a plurality of the recording layers are formed with the spacer layer therebetween.

9. The optical recording medium according to claim 3, further comprising
 a spacer layer, and wherein
 a plurality of the recording layers are formed with the spacer layer therebetween.

10. The optical recording medium according to claim 4, wherein
 tracks for forming the recording mark are formed at track pitches within a range of 0.1 to 0.5 μm.

11. The optical recording medium according to claim 4, further comprising
 a spacer layer, and wherein
 a plurality of the recording layers are formed with the spacer layer therebetween.

* * * * *